United States Patent
Zheng et al.

(10) Patent No.: US 11,516,142 B2
(45) Date of Patent: Nov. 29, 2022

(54) RADIO LINK CONTROL UNACKNOWLEDGED MODE RECEIVE TECHNIQUES

(71) Applicant: Qualcomm Incorporated, San Diego, CA (US)

(72) Inventors: Ruiming Zheng, Beijing (CN); Yu-Ting Yu, San Francisco, CA (US); Keiichi Kubota, Tokyo (JP); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 16/638,097

(22) PCT Filed: Aug. 9, 2018

(86) PCT No.: PCT/CN2018/099678
§ 371 (c)(1),
(2) Date: Feb. 10, 2020

(87) PCT Pub. No.: WO2019/029633
PCT Pub. Date: Feb. 14, 2019

(65) Prior Publication Data
US 2020/0213242 A1 Jul. 2, 2020

(30) Foreign Application Priority Data
Aug. 11, 2017 (WO) ................ PCT/CN2017/097233

(51) Int. Cl.
*H04L 47/34* (2022.01)
*H04W 28/06* (2009.01)

(52) U.S. Cl.
CPC ........... *H04L 47/34* (2013.01); *H04W 28/065* (2013.01)

(58) Field of Classification Search
CPC ...... H04L 47/34; H04L 69/28; H04W 28/065; H04W 80/02; H04W 28/06
See application file for complete search history.

(56) References Cited

U.S. PATENT DOCUMENTS

2010/0080247 A1* 4/2010 Miettinen ........... H04L 49/9094
370/474
2010/0135303 A1 6/2010 Umesh et al.
(Continued)

FOREIGN PATENT DOCUMENTS

| CN | 101686494 A | 3/2010 |
| CN | 105007137 A | 10/2015 |

(Continued)

OTHER PUBLICATIONS

Taiwan Search Report—TW1107128199—TIPO—dated Oct. 11, 2021.

(Continued)

*Primary Examiner* — Christine Ng
(74) *Attorney, Agent, or Firm* — Holland & Hart LLP

(57) ABSTRACT

A wireless device may receive a radio link control (RLC) protocol data unit (PDU) from a lower layer (e.g., from a media access control (MAC) layer) when processing communications (e.g., packets) received from another wireless device. The receiving wireless device may identify that the PDU is an RLC service data unit (SDU) segment based at least in part on an indication corresponding to a sequence number associated with the RLC SDU segment. The receiving wireless device may then determine that the RLC SDU segment is received out of order based on previously received PDUs or previously received RLC SDU segments, and initiate a reassembly timer based on the out of order determination for the RLC SDUs. If the remaining RLC SDU segments (e.g., that complete the RLC SDU) are (Continued)

received before reassembly timer expires, the wireless device may reassemble the RLC SDU to be passed to a higher layer.

29 Claims, 11 Drawing Sheets

(56) References Cited

U.S. PATENT DOCUMENTS

| | | | |
|---|---|---|---|
| 2011/0051664 A1 | 3/2011 | Kim et al. | |
| 2012/0039260 A1* | 2/2012 | Song | H04W 36/0005 370/328 |
| 2012/0155438 A1 | 6/2012 | Shin et al. | |
| 2012/0163161 A1 | 6/2012 | Zhang et al. | |
| 2016/0205587 A1* | 7/2016 | Yu | H04W 28/065 370/230 |
| 2016/0315868 A1* | 10/2016 | Zhang | H04L 47/34 |
| 2018/0063720 A1* | 3/2018 | Ode | H04W 72/085 |
| 2020/0059823 A1* | 2/2020 | Lee | H04W 80/02 |

FOREIGN PATENT DOCUMENTS

| | | |
|---|---|---|
| EP | 2073423 A1 | 6/2009 |
| EP | 3413618 A1 | 12/2018 |
| TW | 200633441 A | 9/2006 |
| WO | WO-2010145165 A1 | 12/2010 |

OTHER PUBLICATIONS

Qualcomm Inc: "E-mail Discussion Summary of RLC UM," R2-1706794, 3GPP TSG-RAN WG2 NR AdHoc, Qingdao, China, Jun. 27-Jun. 29, 2017, pp. 1-26, XP051301291, Retrieved from the Internet: URL: http://www.3gpp.org/ftp/Meetings_3GPP_SYNC/RAN2/Docs/. [retrieved on Jun. 26, 2017] p. 1 p. 21-p. 25.
Supplementary European Search Report—EP18845222—Search Authority—Munich—dated Dec. 11, 2020.
Catt: "NR RLC UM Receive Operation", 3GPP TSG-RAN WG2 Meeting #98, R2-1704262, May 19, 2017, 2 pages.
Catt: "NR RLC UM Receive Operation", 3GPP TSG-RAN WG2 Meeting #NR AH2, R2-1706375, Jun. 29, 2017, 3 pages.
Huawei, et al. RLC UM Operation in NR 3GPP TSG RAN WG2 NR Ad Hoc R2-1706481, Jun. 29, 2017, 3 pages.
International Search Report and Written Opinion—PCT/CN2018/099678—ISA/EPO—dated Oct. 29, 2018.
International Search Report and Written Opinion—PCT/CN2017/097233—ISA/EPO—dated May 2, 2018.
Oppo: "NR RLC UM Operation", 3GPP TSG RAN WG2#NR_AdHoc#2, R2-1706346, Jun. 29, 2017, 2 pages.
Qualcomm Incorporated: "RLC UM Operation", R2-1708952, 3GPP TSG-RAN WG2 Meeting #99, Berlin, Germany, Aug. 21-25, 2017, Internet: <url:http://www.3gpp.org/ftp/tsg_ran/WG2_RL2/TSGR2_99/Docs/R2-1708952.zip, </url:<a>pp. 1-6.
Xiaomi: "Issues on SO-Based Segmentation", 3GPP TSG RAN WG2 Meeting #96, R2-167795, Reno, Nevada. Nov. 14-Nov. 18, 2016, Internet URL: http://www.3gpp.org/ftp/tsg_ran/WG2_RL2/TSGR2_96/Docs/R2-167795.zip, Nov. 14, 2016, Section 2, pp. 1-3.

* cited by examiner

RADIO LINK CONTROL UNACKNOWLEDGED MODE RECEIVE TECHNIQUES

CROSS REFERENCES

The present 371 application for patent claims priority to International Patent Application No. PCT/CN2018/099678 by Zheng et al., entitled, "RADIO LINK CONTROL UNACKNOWLEDGED MODE RECEIVE TECHNIQUES," filed Aug. 9, 2018; and to International Patent Application No. PCT/CN2017/097233 to Zheng et. al, entitled "RADIO LINK CONTROL UNACKNOWLEDGED MODE RECEIVE TECHNIQUES," filed Aug. 11, 2017, each of which is assigned to the assignee hereof.

BACKGROUND

The following relates generally to wireless communication, and more specifically to radio link control (RLC) unacknowledged mode receive techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples, a wireless system may utilize multiple protocol layers to process wireless transmissions. For example, a communications system may be based on functions divided into a packet data convergence protocol (PDCP) layer (e.g., for header compression and sequencing), an RLC layer (e.g., for error correction and segmentation/concatenation of packets), a medium access control (MAC) layer (e.g., for multiplexing and error correction), etc. In some cases, packets or information passed between layers (e.g., packets or information passed to the RLC layer) may be associated with unnecessary overhead (e.g., such as unnecessary header information, etc.) during certain modes of operation. Improved techniques for RLC operation may thus be desired.

SUMMARY

The described techniques relate to improved methods, systems, devices, or apparatuses that support radio link control (RLC) unacknowledged mode receive techniques. Generally, the described techniques provide for RLC service data unit (SDU) segment reassembly. A wireless device may receive an RLC protocol data unit (PDU) from a lower layer (e.g., from a media access control (MAC) layer) when processing communications (e.g., packets) received from another wireless device. The receiving wireless device may identify that the PDU is an RLC SDU segment based at least in part on an indication corresponding to a sequence number associated with the RLC SDU segment (e.g., the PDU may be identified as an RLC SDU segment based on the presence of a sequence number in the PDU). The receiving wireless device may then determine that the RLC SDU segment is received out of order based on previously received PDUs or previously received RLC SDU segments, and initiate a reassembly timer based on the determination that the RLC SDU segments were received out of order (e.g., based on the sequence numbers associated with the RLC SDU segment and sequence numbers associated with the previously received PDUs or previously received RLC SDU segments). If the remaining RLC SDU segments (e.g., the remaining RLC SDU segments that complete the RLC SDU) are received before expiration of the reassembly timer, the wireless device may reassemble the RLC SDU (e.g., the complete RLC SDU) to be passed to a higher layer (e.g., a packet data convergence protocol (PDCP) layer or a radio resource control (RRC) layer).

For example, the receiving wireless device may maintain or start a reassembly timer when a PDU with a new sequence number is identified, when a gap in received PDU sequence numbering is detected, etc., as described in further detail below. The receiving wireless device may thus use one or more reassembly timers to determine whether received PDUs are buffered for reassembly (e.g., if the timer has not yet expired) or discarded (e.g., if the timer expires prior to gap resolution, if the timer expires prior to reception of remaining PDUs associated with a certain sequence number, etc.).

A method of wireless communication is described. The method may include receiving, at an RLC layer, a PDU from lower layer, and identifying that the PDU is an RLC SDU segment based at least in part on an indication corresponding to a sequence number associated with the RLC SDU segment. The method may further include determining that the RLC SDU segment is received out of order based at least in part on previously received PDUs or previously received RLC SDU segments, and initiating a reassembly timer based at least in part on the determination that the RLC SDU segment is received out of order.

An apparatus for wireless communication is described. The apparatus may include means for receiving, at an RLC layer, a PDU from lower layer, and means for identifying that the PDU is an RLC SDU segment based at least in part on an indication corresponding to a sequence number associated with the RLC SDU segment. The apparatus may further include means for determining that the RLC SDU segment is received out of order based at least in part on previously received PDUs or previously received RLC SDU segments, and means for initiating a reassembly timer based at least in part on the determination that the RLC SDU segment is received out of order.

Another apparatus for wireless communication is described. The apparatus may include a processor, memory in electronic communication with the processor, and instructions stored in the memory. The instructions may be operable to cause the processor to receive, at an RLC layer, a PDU from lower layer, and identify that the PDU is an RLC SDU segment based at least in part on an indication corresponding to a sequence number associated with the RLC SDU segment. The instructions may be further operable to cause the processor to determine that the RLC SDU segment is received out of order based at least in part on previously received PDUs or previously received RLC SDU segments, and initiate a reassembly timer based at least in part on the determination that the RLC SDU segment is received out of order.

A non-transitory computer readable medium for wireless communication is described. The non-transitory computer-readable medium may include instructions operable to cause a processor to receive, at an RLC layer, a PDU from lower layer, and identify that the PDU is an RLC SDU segment based at least in part on an indication corresponding to a sequence number associated with the RLC SDU segment. The non-transitory computer-readable medium may include instructions further operable to cause a processor to determine that the RLC SDU segment is received out of order based at least in part on previously received PDUs or previously received RLC SDU segments, and initiate a reassembly timer based at least in part on the determination that the RLC SDU segment is received out of order.

Some examples of the method, apparatus, and non-transitory computer-readable medium described above may further include processes, features, means, or instructions for determining that one or more RLC SDU segments stored in a receive buffer may be not in sequence, wherein the reassembly timer may be initiated based at least in part on the determination that one or more SDU segments stored in the receive buffer may be not in sequence. In some examples of the method, apparatus, and non-transitory computer-readable medium described above, determining that the RLC SDU segment may be received out of order comprises identifying a missing RLC SDU segment of an RLC SDU based at least in part on the received RLC SDU segment and the previously received PDUs or previously received RLC SDU segments.

In some examples of the method, apparatus, and non-transitory computer-readable medium described above, identifying the missing RLC SDU segment of the RLC SDU comprises identifying a gap between the previously received PDUs or previously received RLC SDU segments. In some examples of the method, apparatus, and non-transitory computer-readable medium described above, the missing RLC SDU segment comprises a first byte of the RLC SDU and the received RLC SDU segment comprises a second byte following the first byte. In some examples of the method, apparatus, and non-transitory computer-readable medium described above, the missing RLC SDU segment comprises a last byte of the RLC SDU and the received RLC SDU segment excludes a corresponding sequence number. In some examples of the method, apparatus, and non-transitory computer-readable medium described above, the missing RLC SDU segment may be associated with a first sequence number, and the sequence number associated with the received RLC SDU segment may be greater than the first sequence number.

Some examples of the method, apparatus, and non-transitory computer-readable medium described above may further include processes, features, means, or instructions for determining that the sequence number associated with the RLC SDU segment may be greater than a highest sequence number associated with the previously received PDUs or previously received RLC SDU segments. In some examples of the method, apparatus, and non-transitory computer-readable medium described above, determining that the sequence number associated with the RLC SDU segment may be greater than the highest sequence number comprises determining that the sequence number associated with the PDU may be greater than zero.

Some examples of the method, apparatus, and non-transitory computer-readable medium described above may further include processes, features, means, or instructions for updating a value of a variable corresponding to the highest sequence number with the sequence number associated with the RLC SDU segment. Some examples of the method, apparatus, and non-transitory computer-readable medium described above may further include processes, features, means, or instructions for updating a value of a variable based at least in part on a largest unassembled sequence number after a largest reassembled sequence number.

In some examples of the method, apparatus, and non-transitory computer-readable medium described above, the indication corresponding to the sequence number comprises a value in a header of the RLC SDU segment that indicates the sequence number or a segmentation identifier in the header of the RLC SDU segment. Some examples of the method, apparatus, and non-transitory computer-readable medium described above may further include processes, features, means, or instructions for performing reassembly of one or more SDUs that includes the RLC SDU segment and one or more previously received SDU segments based at least in part on the reassembly timer. In some examples of the method, apparatus, and non-transitory computer-readable medium described above, the reassembly of the SDU may be performed prior to expiration of the reassembly timer.

Some examples of the method, apparatus, and non-transitory computer-readable medium described above may further include processes, features, means, or instructions for performing reassembly of one or more SDUs corresponding to a sequence number associated with the reassembly timer, wherein the initiated reassembly timer corresponds to the sequence number. Some examples of the method, apparatus, and non-transitory computer-readable medium described above may further include processes, features, means, or instructions for discarding the RLC SDU segments associated with the sequence number based at least in part on the reassembly timer exceeding a threshold.

Some examples of the method, apparatus, and non-transitory computer-readable medium described above may further include processes, features, means, or instructions for discarding one or more unassembled RLC SDU segments stored in a receive buffer upon expiration of the reassembly timer based at least in part on a value of a variable corresponding to a highest sequence number of the RLC SDU segment set when initiating the reassembly timer. Some examples of the method, apparatus, and non-transitory computer-readable medium described above may further include processes, features, means, or instructions for discarding one or more unassembled RLC SDU segments stored in a receive buffer upon expiration of the reassembly timer based at least in part on a value of a variable corresponding to a largest unassembled sequence number after a largest reassembled sequence number set when initiating the reassembly timer.

Some examples of the method, apparatus, and non-transitory computer-readable medium described above may further include processes, features, means, or instructions for restarting the reassembly timer based at least in part on the determination that one or more RLC SDU segments remaining in the receive buffer may be out of order.

In some examples of the method, apparatus, and non-transitory computer-readable medium described above, the reassembly timer comprises a t-reassembly timer or a t-reordering timer.

A method of wireless communication is described. The method may include receiving, at an RLC layer, a PDU from a lower layer, and identifying that the PDU is a complete RLC SDU. The method may further include determining that a previously received RLC SDU segment is stored in a receive buffer at the RLC layer, and initiating a reassembly timer based at least in part on the determination that the previously received RLC SDU segment is stored in a receive buffer at the RLC layer.

An apparatus for wireless communication is described. The apparatus may include means for receiving, at an RLC layer, a PDU from a lower layer, and means for identifying that the PDU is a complete RLC SDU. The apparatus may further include means for determining that a previously received RLC SDU segment is stored in a receive buffer at the RLC layer, and means for initiating a reassembly timer based at least in part on the determination that the previously received RLC SDU segment is stored in a receive buffer at the RLC layer.

Another apparatus for wireless communication is described. The apparatus may include a processor, memory in electronic communication with the processor, and instructions stored in the memory. The instructions may be operable to cause the processor to receive, at an RLC layer, a PDU from a lower layer, and identify that the PDU is a complete RLC SDU. The instructions may be further operable to cause the processor to determine that a previously received RLC SDU segment is stored in a receive buffer at the RLC layer, and initiate a reassembly timer based at least in part on the determination that the previously received RLC SDU segment is stored in a receive buffer at the RLC layer.

A non-transitory computer readable medium for wireless communication is described. The non-transitory computer-readable medium may include instructions operable to cause a processor to receive, at an RLC layer, a PDU from a lower layer, and identify that the PDU is a complete RLC SDU. The non-transitory computer-readable medium may include instructions further operable to cause a processor to determine that a previously received RLC SDU segment is stored in a receive buffer at the RLC layer, and initiate a reassembly timer based at least in part on the determination that the previously received RLC SDU segment is stored in a receive buffer at the RLC layer.

Some examples of the method, apparatus, and non-transitory computer-readable medium described above may further include processes, features, means, or instructions for identifying a missing RLC SDU segment of an RLC SDU based at least in part on the previously received RLC SDU segment stored in the receive buffer and the complete SDU.

Some examples of the method, apparatus, and non-transitory computer-readable medium described above may further include processes, features, means, or instructions for identifying a gap between previously received PDUs or previously received RLC SDU segments based at least in part on the complete SDU.

Some examples of the method, apparatus, and non-transitory computer-readable medium described above may further include processes, features, means, or instructions for determining that a sequence number associated with the RLC SDU segment may be greater than a highest sequence number associated with previously received PDUs or previously received RLC SDU segments. In some examples of the method, apparatus, and non-transitory computer-readable medium described above, determining that the sequence number associated with the RLC SDU segment may be greater than the highest sequence number comprises determining that the sequence number associated with the PDU may be greater than zero.

Some examples of the method, apparatus, and non-transitory computer-readable medium described above may further include processes, features, means, or instructions for updating a value of a variable corresponding to the highest sequence number with the sequence number associated with the RLC SDU segment. Some examples of the method, apparatus, and non-transitory computer-readable medium described above may further include processes, features, means, or instructions for updating a value of a variable based at least in part on a largest unassembled sequence number after a largest reassembled sequence number.

In some examples of the method, apparatus, and non-transitory computer-readable medium described above, an indication corresponding to the sequence number comprises a value in a header of the RLC SDU segment that indicates the sequence number or a segmentation identifier in the header of the RLC SDU segment.

Some examples of the method, apparatus, and non-transitory computer-readable medium described above may further include processes, features, means, or instructions for performing reassembly of one or more SDUs that includes the RLC SDU segment and one or more previously received SDU segments based at least in part on the reassembly timer. Some examples of the method, apparatus, and non-transitory computer-readable medium described above may further include processes, features, means, or instructions for performing reassembly of one or more SDUs corresponding to a sequence number associated with the reassembly timer, wherein the initiated reassembly timer corresponds to the sequence number. Some examples of the method, apparatus, and non-transitory computer-readable medium described above may further include processes, features, means, or instructions for discarding the RLC SDU segments associated with the sequence number based at least in part on the reassembly timer exceeding a threshold.

In some examples of the method, apparatus, and non-transitory computer-readable medium described above, the reassembly of the SDU may be performed prior to expiration of the reassembly timer. Some examples of the method, apparatus, and non-transitory computer-readable medium described above may further include processes, features, means, or instructions for discarding one or more unassembled RLC SDU segments stored in a receive buffer upon expiration of the reassembly timer based at least in part on a value of a variable corresponding to a highest sequence number of the RLC SDU segment set when initiating the reassembly timer.

Some examples of the method, apparatus, and non-transitory computer-readable medium described above may further include processes, features, means, or instructions for restarting the reassembly timer based at least in part on the determination that one or more RLC SDU segments remaining in the receive buffer may be out of order. Some examples of the method, apparatus, and non-transitory computer-readable medium described above may further include processes, features, means, or instructions for discarding one or more unassembled RLC SDU segments stored in a receive buffer upon expiration of the reassembly timer based at least in part on a value of a variable corresponding to a largest unassembled sequence number after a largest reassembled sequence number set when initiating the reassembly timer. Some examples of the method, apparatus, and non-transitory computer-readable medium described above may further include processes, features, means, or instructions for restarting the reassembly timer based at least in part on the determination that one or more RLC SDU segments remaining in the receive buffer may be out of order.

DETAILED DESCRIPTION

Figure 1:
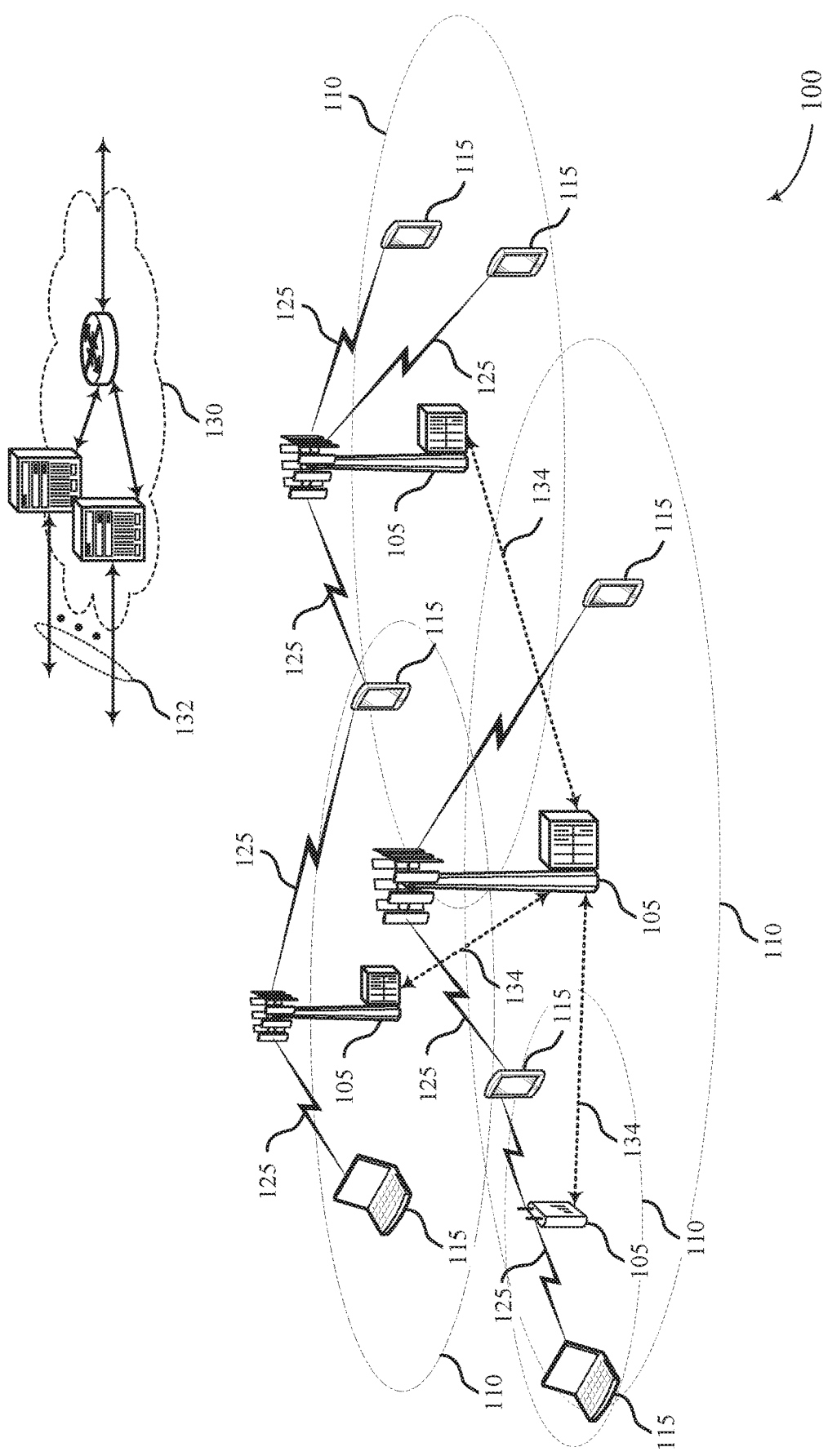
FIG. 1 illustrates an example of a system for wireless communication that supports radio link control (RLC) unacknowledged mode receive techniques in accordance with aspects of the present disclosure.

In some wireless communication systems, a radio link control (RLC) entity or RLC layer in a base station or a user equipment (UE) may be associated with supporting packet organization, for both packet transmission and packet reception, by monitoring transport block size (e.g., corresponding to the media access control (MAC) layer transport block size). If a base station or UE is receiving communications (e.g., if a base station or UE is acting as a receiving wireless device), the RLC layer may receive RLC protocol data units (PDUs) (e.g., MAC service data units (SDUs)) and assemble the RLC PDUs into RLC SDUs to be passed to upper layers. For example, an RLC layer may receive an RLC PDU (e.g., a MAC SDU) from a MAC layer, remove an RLC header from the RLC PDU, assemble an RLC SDU (e.g., based on information contained in the RLC header), and pass the RLC SDU to a packet data convergence protocol (PDCP) layer or a radio resource control (RRC) layer. Assembly of the RLC SDU from received RLC PDUs may include combining certain RLC PDUs into larger chunks of information, organizing the received RLC PDUs according to their sequence numbers (e.g., indicated by their respective RLC headers), etc.

In some cases, headers (e.g., RLC headers which may include RLC PDU sequence numbers) may be associated with RLC PDUs that have previously been segmented by a transmitting device. For example, information that has been segmented (e.g., broken into two or more chunks) at an RLC layer of a transmitting device for transmission may need to be reassembled or concatenated back together at the RLC layer of the receiving device. Therefore, according to techniques described herein, an RLC PDU may be associated with a sequence number if the RLC PDU is to be associated with a reassembly or concatenation procedure (e.g., if the RLC PDU is an RLC SDU segment to be reassembled or concatenated with other RLC SDU segments to result in a complete RLC SDU). If a receiving wireless device receives or obtains an RLC PDU (e.g., from a MAC layer) that contains a sequence number (e.g., or an RLC header), the wireless device may buffer the RLC PDU for reassembly (e.g., for reassembly with certain other RLC PDUs, performed based on respective sequence numbers). If a receiving wireless device receives or obtains an RLC PDU (e.g., from a MAC layer) that does not contain a sequence number or RLC header, the wireless device may promptly pass or deliver the RLC SDU (e.g., derived from or obtained as the RLC PDU) to an upper layer (e.g., the PDCP layer).

In some cases, the receiving wireless device may store a reassembly timer for RLC operation relating to reassembly of RLC PDUs (e.g., reassembly of RLC SDU segments). For example, the receiving wireless device may maintain or start a reassembly timer when a PDU with a new sequence number is identified, when a gap in received PDU sequence numbering is detected, etc., as described in further detail below. The receiving wireless device may thus use one or more reassembly timers to determine whether received PDUs are buffered for reassembly (e.g., if the timer has not yet expired) or discarded (e.g., if the timer expires prior to gap resolution, if the timer expires prior to reception of remaining PDUs associated with a certain sequence number, etc.).

In some cases, the receiving wireless device may store or maintain a reassembly window for RLC operation relating to reassembly of RLC PDUs. For example, a receiving wireless device may determine that a sequence number associated with a PDU received at the RLC layer is outside of a maintained reassembly window, and the wireless device may discard the PDU. If the sequence number is within the reassembly window, the wireless device may store or buffer the PDU (e.g., for reassembly). The following discussion further details such techniques for RLC unacknowledged mode (UM) reception.

Aspects of the disclosure are initially described in the context of a wireless communications system. Aspects of the disclosure are then illustrated by and described with reference to process flows implementing discussed techniques. Aspects of the disclosure are further illustrated by and described with reference to apparatus diagrams, system diagrams, and flowcharts that relate to RLC unacknowledged mode receive techniques.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced (LTE-A)) network, or a NR network. In some aspects, wireless communications system 100 may support enhanced broadband communications, ultra-reliable (i.e., mission critical) communications, low latency communications, and communications with low-cost and low-complexity devices. In addition, the wireless communications system 100 may support RLC unacknowledged mode receive techniques.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (ITI) of a downlink channel may be distributed between different control regions in a cascaded manner (e.g., between a common control region and one or more UE-specific control regions). The wireless communications system 100 may also include access network entities configured to manage communications between entities. In some examples, access network entities may include one or more base stations. As used herein, the term base station may refer to access network entities and vice-versa.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some aspects, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some aspects, groups of UEs 115 communicating via D2D communications may utilize a one-to-many (1:M) system in which each UE 115 transmits to every other UE 115 in the group. In some aspects, a base station 105 facilitates the scheduling of resources for D2D communications. In other aspects, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some aspects, an MTC device may operate using half-duplex (one-way) communications at a reduced peak rate. MTC devices may also be configured to enter a power saving "deep sleep" mode when not engaging in active communications. In some aspects, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., SI, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 (and/or evolved node Bs, eNodeBs, NodeBs) may also be referred to as eNodeBs (eNBs) 105 and/or next generation NodeB (gNB).

A base station 105 may be connected by an SI interface to the core network 130. The core network may be an evolved packet core (EPC) or a NextGen Core (NGC). The EPC may include at least one mobile management entity (MME), at least one S-GW, and at least one P-GW. The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The NGC may include at least one access and mobility management function (AMF) and at least one session management function (SMF), and at least one user-plane function (UPF). The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105-a may include subcomponents such as an access network entity, which may be an example of an access node controller (ANC). Each access network entity may communicate with a number of UEs 115 through a number of other access network transmission entities, which may be an example of a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some aspects wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some aspects, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some aspects, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beam-formed differently). A mmW receiver (e.g., a UE 115) may try multiple beams (e.g., antenna subarrays) while receiving the synchronization signals.

In some aspects, the antennas of a base station 105 or UE 115 may be located within one or more antenna arrays, which may support beamforming or MIMO operation. One or more base station antennas or antenna arrays may be collocated at an antenna assembly, such as an antenna tower. In some aspects, antennas or antenna arrays associated with a base station 105 may be located in diverse geographic locations. A base station 105 may multiple use antennas or antenna arrays to conduct beamforming operations for directional communications with a UE 115.

In some aspects, wireless communications system 100 may be a packet-based network that operates according to a layered protocol stack. In the user plane, communications at the bearer or PDCP layer may be internet protocol (IP)-based. A RLC layer may in some aspects perform packet segmentation and reassembly to communicate over logical channels. A MAC layer may perform priority handling and multiplexing of logical channels into transport channels. In some cases, the MAC layer may also use Hybrid ARQ (HARQ) to provide retransmission at the MAC layer to improve link efficiency. In the control plane, the RRC protocol layer may provide establishment, configuration, and maintenance of an RRC connection between a UE 115 and a network device such as a base station 105 or core network 130 supporting radio bearers for user plane data. At the Physical (PHY) layer, transport channels may be mapped to physical channels.

The PDCP layer may be responsible for receiving IP packets, performing header compression and decompression using, for instance, a robust header compression (ROHC) protocol, transfer of data (user plane or control plane), maintenance of PDCP sequence numbers (SNs), and in-sequence delivery of upper layer PDUs to lower layers. The PDCP layer may also manage packets to avoid duplicates, ciphering and deciphering of user plane data and control plane data, integrity protection and integrity verification of control plane data, and packet discarding based on a timer-out timer.

An RLC layer may connect layers higher than the RLC layer (e.g., the PDCP layer) to layers lower than the RLC layer (e.g., the MAC layer). In some examples an RLC entity in a base station 105 or a UE 115 may be associated with supporting transmission packet organization by monitoring transport block size (e.g., corresponding to the MAC layer transport block size). If an incoming data packet (i.e., a PDCP or RRC SDU) is too large for transmission, the RLC layer may segment it into several smaller RLC PDUs. If the incoming packets are too small, the RLC layer may concatenate several of them into a single, larger RLC PDU. Each RLC PDU may include a header including information about how to reassemble the data. The RLC layer may also be associated with ensuring that packets are reliably transmitted. In some cases, the transmitter may keep a buffer of indexed RLC PDUs. In some cases, wireless communications system 100 may operate without an RLC layer, and one or more functions associated with the RLC layer (e.g., status reporting) may be performed by a MAC layer or a PDCP layer.

In some cases, a source device may send a Poll Request to determine which PDUs have been received and the target device may respond with a Status Report. Unlike the MAC layer HARQ, automatic repeat request (ARQ) may not include a forward error correction function. An entity performing ARQ functions may operate in one of three modes. In acknowledged mode (AM), unacknowledged mode (UM) and transparent mode (TM). In AM, the ARQ entity may perform segmentation/concatenation and ARQ. This mode may be appropriate for delay tolerant or error sensitive transmissions. In UM, the ARQ entity may perform segmentation/concatenation but not ARQ. This may be appropriate for delay sensitive or error tolerant traffic (e.g., voice over Long Term evolution (VoLTE)). TM may perform data buffering, but may not include either concatenation/segmentation or ARQ. TM may be used primarily for sending broadcast control information (e.g., the master information block (MIB) and system information blocks (SIBs)), paging messages, and RRC connection messages. Some transmissions may be sent without the participation of an ARQ entity (e.g., a random access channel (RACH) preamble and response).

Time intervals in LTE or NR may be expressed in multiples of a basic time unit (which may be a sampling period of $T_s=1/30,720,000$ seconds). Time resources may be organized according to radio frames having a length, such as for example 10 ms ($T_f=307200$ $T_s$), which may be identified by a system frame number (SFN), for example having a range from 0 to 1023. Each frame may include a number of subframes, such as for example ten 1 ms subframes numbered from 0 to 9. A subframe may be further divided into slots, such as for example two 0.5 ms slots, each of which may contain a number of modulation symbol periods (depending on the length of the cyclic prefix prepended to each symbol). Excluding the cyclic prefix, each symbol contains sample periods, such as for example 2048 sample periods. In some aspects the subframe may be the smallest scheduling unit, also known as a TTI. In other aspects, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (I slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature that may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some aspects, wireless communications system 100 may utilize enhanced component carriers (eCCs). An eCC may be characterized by one or more features including: wider bandwidth, shorter symbol duration, shorter TTIs, and modified control channel configuration. In some aspects, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some aspects, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some aspects, the TTI duration (that is, the number of symbols in a TTI) may be variable. In some aspects, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some aspects, the TTI duration (that is, the number of symbols in a TTI) may be variable.

In some aspects, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some aspects, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

A wireless devices in wireless communications system 100 (e.g., base stations 105 and UEs 115) may receive a RLC PDU from a lower layer (e.g., from a MAC layer) when processing communications (e.g., packets) received from another wireless device (e.g., a transmitting base station 105, a transmitting UE 115, etc.). The receiving base station 105 or UE 115 may identify that the PDU is an RLC SDU segment based at least in part on an indication corresponding to a sequence number associated with the RLC SDU segment. The receiving base station 105 or UE 115 may then determine that the RLC SDU segment is received out of order based on previously received PDUs or previously received RLC SDU segments, and initiate a reassembly timer based on the out of order determination for the RLC SDUs. If the remaining RLC SDU segments (e.g., that complete the RLC SDU) are received before reassembly timer expires, the receiving base station 105 or UE 115 may reassemble the RLC SDU to be passed to a higher layer.

Figure 2:
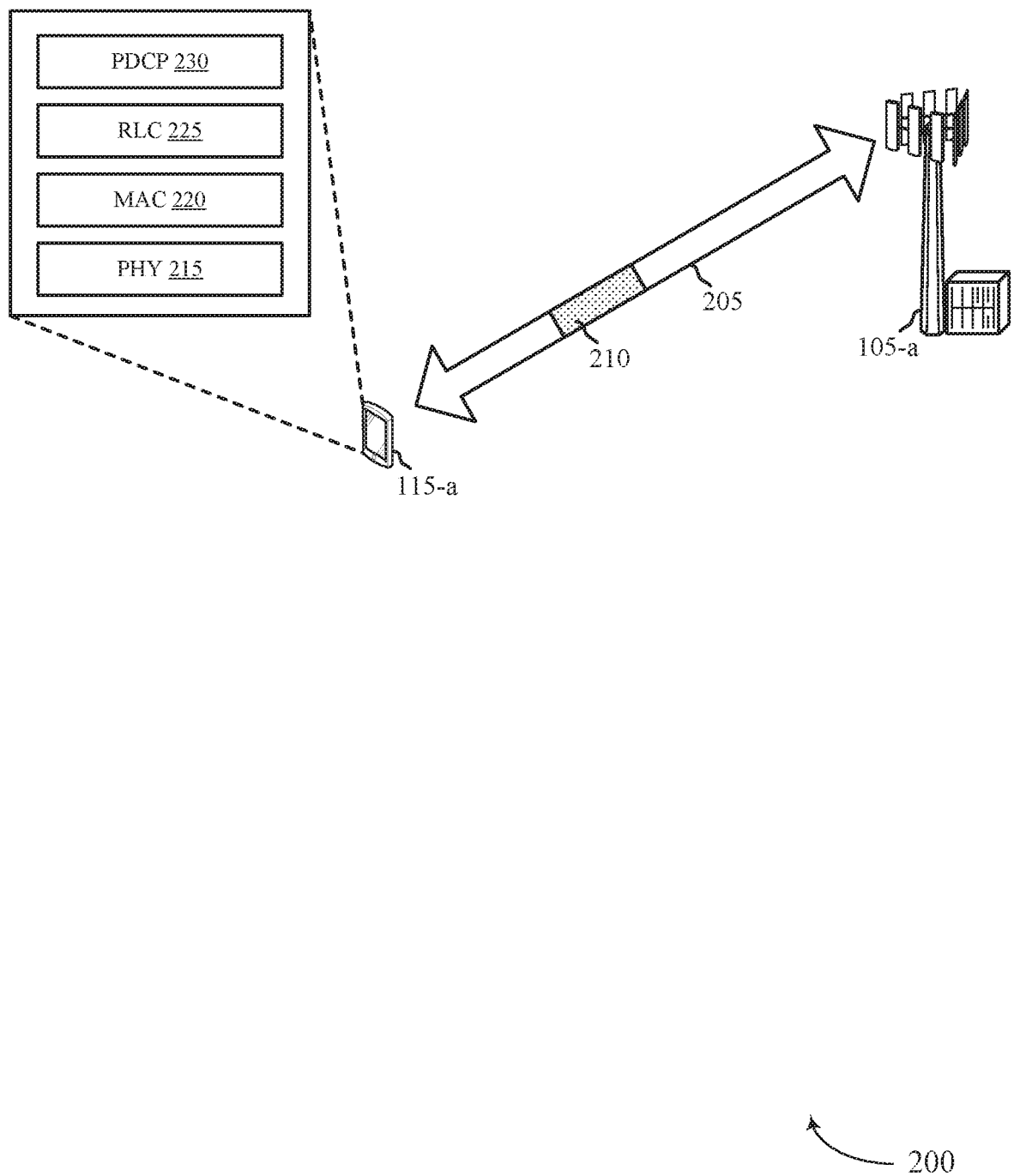
FIG. 2 illustrates an example of a wireless communications system that supports RLC unacknowledged mode receive techniques in accordance with aspects of the present disclosure.

FIG. 2 illustrates an example of a wireless communications system 200 implementing techniques for RLC receive operation. The wireless communications system 200 may be an example of the wireless communications system 100 discussed with reference to FIG. 1. The wireless communications system 200 may include a base station 105-*a* and a UE 115-*a*. As discussed above, the term base station 105 may refer to an access network entity. While only a single base station 105-*a* and a single UE 115-*a* are depicted, the wireless communications system 200 may include additional base stations 105 and additional UEs 115. The base station 105-*a* may be an example of the base stations 105 described with reference to FIG. 1. The UE 115-*a* be an example of the UEs 115 described with reference to FIG. 1.

The base station 105-*a* and the UE 115-*a* may communicate or exchange transmissions 205 via a communication link 125. Transmissions 205 may be transmitted or received by either entity, the base station 105-*a* or the UE 115-*a* (e.g., transmissions 205 may, in some cases, refer to uplink and/or downlink transmissions). Transmissions 205 may, in some cases, be quantified in terms of packets 210, which may be associated with information or data of a certain amount or size. In the present example, UE 115-*a* may be receiving transmissions 205 from base station 105-*a* (e.g., UE 115-*a* may be an example of a receiving wireless device, and base station 105-*a* may be an example of a transmitting wireless device). Upon receiving transmissions 205, UE 115-*a* may process each received packet 210 via operations performed at multiple protocol layers. For example, UE 115-*a* may include at least a PHY layer 215, a MAC layer 220, an RLC layer 225, and a PDCP layer 230 for processing of packets 210. At the PHY layer 215, UE 115-*a* may map the received packet 210 from a physical channel (e.g., the received transmission channel of communication link 125) to transport channels. The information may then be passed to the MAC layer 220 (e.g., as a MAC PDU) for priority handling and de-multiplexing of the transport channels into logical channels. The information (e.g., the MAC SDU) may then be passed to the RLC layer 225 (e.g., interpreted as an RLC PDU or, in some cases, an RLC SDU segment) for packet segmentation and, in some cases, packet reassembly over the logical channels. The information (e.g., the RLC SDU or complete RLC SDU) may then be finally passed to upper layers, such as a PDCP layer 230 (e.g., interpreted as a PDCP PDU). In some cases, base station 105-a may include similar protocol layers, and may process packets 210 for transmission in a similar or reverse manner at each layer (e.g., see additional description of such processes as described with reference to FIG. 1).

In some cases, all RLC PDUs may be associated with or include RLC headers (e.g., sequence numbers) for packet segmentation and, in some cases, packet reassembly. However, in some cases, only packets that have been segmented by a transmitting device (e.g., RLC PDUs or RLC SDU segments that will need to be reassembled at a receiving wireless device) may include or be associated with headers or sequence numbers. The UE 115-a may identify an RLC PDU is an RLC SDU segment (e.g., is to be combined with other RLC PDUs to generate a complete RLC SDU for passing to an upper layer) by a segmentation indicator identifier in the header or, in some cases, by identifying the PDU has a sequence number. If a receiving wireless device receives or obtains an RLC PDU (e.g., from a MAC layer) that is determined to be an RLC SDU segment (e.g., via an identified sequence number, a segmentation identifier in an RLC header, etc.), the wireless device may buffer the RLC PDU for reassembly (e.g., for reassembly with certain other RLC PDUs, performed based on respective sequence numbers). If a receiving wireless device receives or obtains an RLC PDU (e.g., from a MAC layer) that does not contain a sequence number or RLC header, the wireless device may promptly pass or deliver the RLC SDU (e.g., derived from or obtained as the RLC PDU) to an upper layer (e.g., the PDCP layer).

In some cases, it may be desirable to discard some information (e.g., PDUs or SDU segments) stored in the buffer due to, for example, memory constraints. As such, a wireless device (e.g., UE 115-a) may discard a received PDU or clear the buffer of a PDU based on the expiration of a stored reassembly timer, the reception of a PDU with a sequence number outside of a stored reassembly window (e.g., a window or range of sequence numbers associated with current PDUs), the reception of a duplicate PDU (e.g., determined based on the sequence number and/or segmentation identifier), etc. Upon identification of such a condition, the UE 115-a may discard the PDU that triggered the condition (e.g., the PDU associated with an expired reassembly timer), discard all PDUs with the same sequence number as the PDU that triggered the condition or, in some cases, discard all PDUs before a stored state variable (e.g., discard all PDUs before a stored sequence number stored at the UE 115-a). Details relating to such conditions are now described.

A receiving UE 115-a may store a reassembly timer for RLC operation relating to reassembly of RLC PDUs. More specifically, UE 115-a may store a reassembly timer for RLC SDU reassembly (e.g., reassembly of RLC SDU segments), such that buffered PDUs (e.g., or SDU segments) are discarded upon expiry of the timer. In some cases, the timer may be configured by the network. Initiating or starting the timer may be based on a determination that a received PDU is associated with a new sequence number or based on a detection of a gap (e.g., in PDU sequence numbers). For example, when a PDU is received at an RLC layer, UE 115-a may start a reassembly timer if the PDU has a new sequence number (e.g., if the PDU is associated with a sequence number that no previously received PDU is associated with). In cases where a PDU is received without a sequence number, a timer may not be initiated (e.g., the PDU may be immediately passed to an upper layer).

In some cases, the timer may be started or initiated when a gap in PDU reception (e.g., at the RLC layer) is detected. For example, if a UE 115-a has a PDU already stored in the buffer and another PDU is received without a sequence number, the UE 115-a may start the reassembly timer. As another example, the reassembly timer may be started if a PDU is received with a sequence number that is different than a sequence number of a PDU already in the buffer. Finally, the timer may be started if a PDU is received with a sequence number that is the same as a sequence number of a PDU already in the buffer, but the two PDUs are not in consecutive byte order (e.g., determined based on a segmentation identifier included in the header). In some cases, initiation of the reassembly timer may assume the reassembly timer is not already running. If the reassembly timer is already running and one of the above conditions holds true, the reassembly timer may continue to increment according to the original start time (e.g., until the reassembly timer expires or is stopped).

The reassembly timer may be stopped when the received PDU (e.g., the RLC SDU segment) may be reassembled with other PDUs (e.g., other PDUs with the same sequence number already stored in the buffer of UE 115-a) to complete an RLC SDU. That is, the reassembly timer may be stopped when a complete RLC SDU is reassembled for passing to an upper layer. Following such reassembly, the UE 115-a may continue to receive PDUs at the RLC layer, and may restart the reassembly timer for any newly received PDUs according to the discussion above. However, in cases where the reassembly timer expires prior to assembly of a complete RLC SDU, the UE 115-a may discard the received PDU (e.g., that triggered the reassembly timer), discard all PDUs associated with the same sequence number as the received PDU, discard all segments with sequence numbers less than (e.g., occurring earlier in time than) a stored state variable (e.g., a VR(UX) state variable), etc. In some examples, the timer may be stopped only after all the segments with sequence numbers before the sequence number of the state variable stored by the reassembly timer have been restored. In cases where both a reassembly timer and a reassembly window are maintained, the reassembly timer may be stopped when the reassembly window moves past a stored state variable (e.g., VR(UX)) if it is pending. In cases where the received PDU is already stored in the buffer (e.g., a duplicate PDU was received) the UE 115-a may not initiate the reassembly timer in the first place, and may discard the duplicate PDU received at the RLC layer.

In some cases, the UE 115-a may maintain or initiate multiple timers for RLC receive operation (e.g., RLC PDU reassembly procedures). For example, a reassembly timer may be started for each PDU received that is associated with a new sequence number. The UE 115-a may maintain a timer for each PDU received that is associated with a new sequence number simultaneously (e.g., if a reassembly timer is already running or has already been started and a PDU is received with a new sequence number, the UE 115-a may initiate an additional timer). That is, the UE 115-a may initiate multiple reassembly timers, each started and maintained based on different received PDUs.

In some cases, the receiving wireless device may store or maintain a reassembly window for RLC operation relating to reassembly of RLC PDUs. UE 115-a may maintain a reassembly window for RLC SDU reassembly, such that received PDUs are discarded if their sequence number falls outside of the reassembly window. In other cases, any unreassembled (e.g., unassembled) SDU segments (e.g., PDUs either just received or already stored in the buffer) may be discarded with the reassembly window moves past the sequence number of the SDU segment or PDU (e.g., a pull-based reassembly window).

Figure 3:
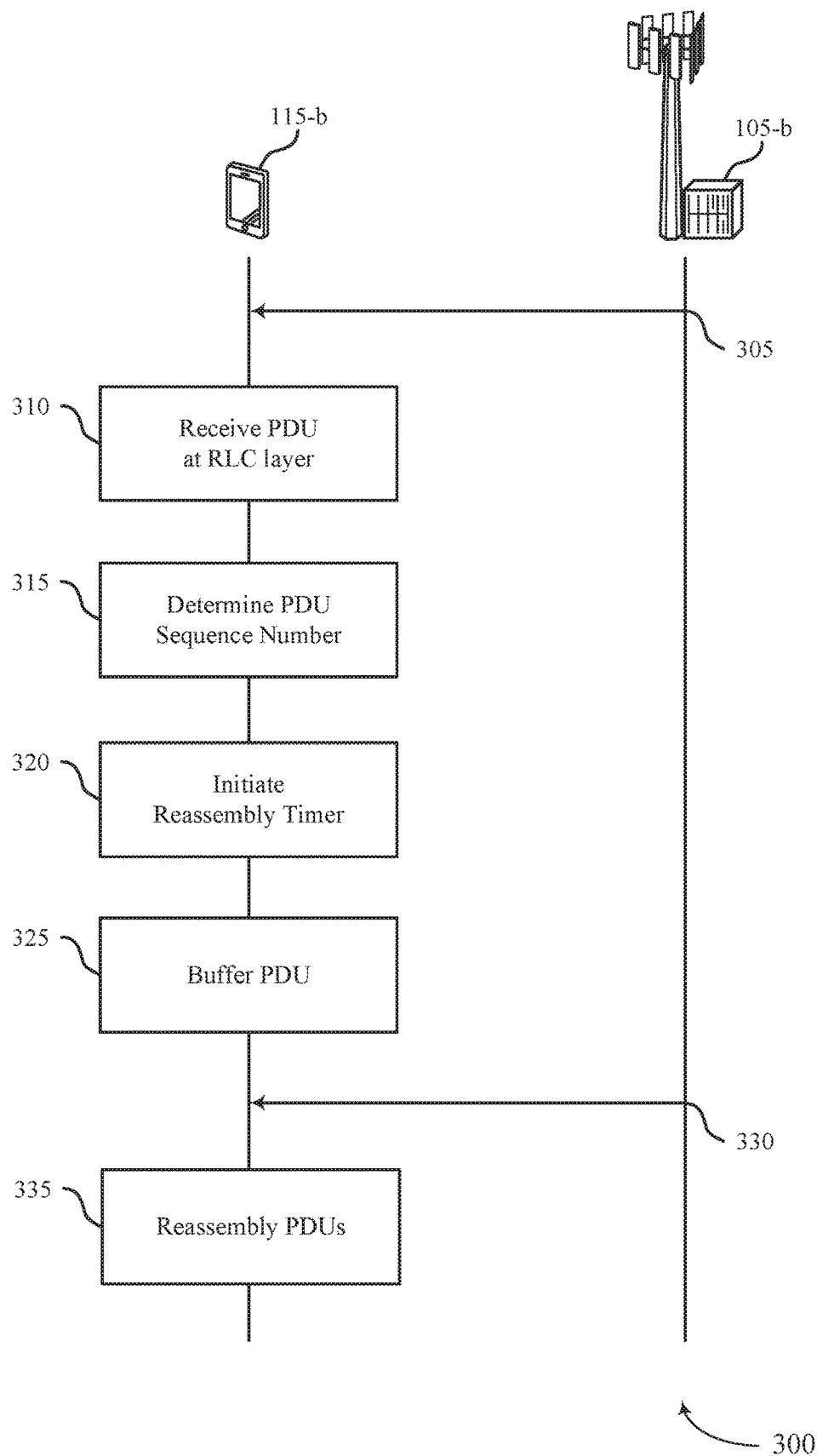
FIG. 3 illustrates an example of a process flow that supports RLC unacknowledged mode receive techniques in accordance with aspects of the present disclosure.

FIG. 3 illustrates an example of a process flow 300 that supports RLC receive techniques in accordance with various aspects of the present disclosure. Process flow 300 includes base station 105-*b* and UE 115-*b*, which may be examples of base stations 105 and UEs 115 as described with reference to FIGS. 1 and 2. Process flow 300 may illustrate UE 115-*b* (e.g., a receiving wireless device) performing RLC PDU reassembly techniques for communications received from base station 105-*b*. In the following description of the process flow 300, the operations between the UE 115-*b* and the base station 105-*b* may be transmitted in a different order than the exemplary order shown, or the operations performed by UE 115-*b* may be performed in different orders or at different times. For example, the techniques performed by UE 115-*b* may in some cases be implemented by base station 105-*b*, for communications received from UE 115-*b* by the base station 105-*b*. In some cases, certain operations may also be left out of the process flow 300, or other operations may be added to the process flow 300.

At 305, base station 105-*b* may transmit a packet to UE 115-*b*.

At 310, UE 115-*b* may receive the packet and pass the packet to an RLC layer (e.g., the UE 115-*b* may receive an RLC PDU). That is, the UE 115-*b* may process the received packet by passing a MAC SDU to the RLC layer, where the packet may be received as an RLC PDU.

At 315, the UE 115-*b* may determine or identify a sequence number associated with the received RLC PDU (e.g., the RLC PDU may be an RLC SDU segment).

At 320, the UE 115-*b* may initiate a reassembly timer based on, for example, the sequence number determined at 315. For example, the timer may be initiated if the sequence number is new or if the sequence number indicates a gap in received PDUs. For example, the timer may be initiated if UE 115-*b* determines that the PDU is an RLC SDU segment that has been received out of order (e.g., based on previously received PDUs or previously received RLC SDU segments).

In some cases, multiple timers may be running concurrently, each of which being associated with different sequence numbers of one or more RLC SDU segments stored in a receive buffer. For instance, an RLC SDU segment with a first sequence number may have been previously received and stored in the buffer. A second RLC SDU segment may then be received and associated with a second sequence number different than the first sequence number. In such cases, the UE 115-*b* may trigger a timer associated with the first sequence number and await any missing RLC SDU segments that correspond to the first sequence number. A third RLC SDU segment may then be received having a sequence number different than the first and second sequence numbers. In this case, the UE 115-*b* may trigger a second timer associated with the second sequence number and await any missing RLC SDU segments that correspond to the second sequence number. Any number of timers may be triggered or running concurrently, each of which may correspond to a different sequence number.

At 325, the UE 115-*b* may buffer the received RLC PDU.

At 330, the base station 105-*b* may transmit another packet to the UE 115-*b*. The packet may be associated with the same sequence number as the packet received at 305. Further, the packet (e.g., the RLC PDU or the RLC SDU segment) may, in combination with the RLC PDU received at 305, complete the RLC SDU associated with the sequence number.

At 335, the UE 115-*b* may reassemble a complete RLC SDU using the RLC PDUs or RLC SDU segments received at 305 and 330. That is, the UE 115-*b* may concatenate the RLC PDU stored in the buffer (e.g., at 325) with the RLC PDU received at 330 (e.g., after the sequence numbers are compared and determined to be matching, after the segment indications for both PDUs have been identified, assuming the reassembly timer has not expired, etc.). Following reassembly of the RLC PDUs (e.g., the RLC SDU segments) to generate the complete RLC SDU, the UE 115-*b* may pass the RLC SDU to an upper layer (e.g., a PDCP layer or RRC layer).

Figure 4:
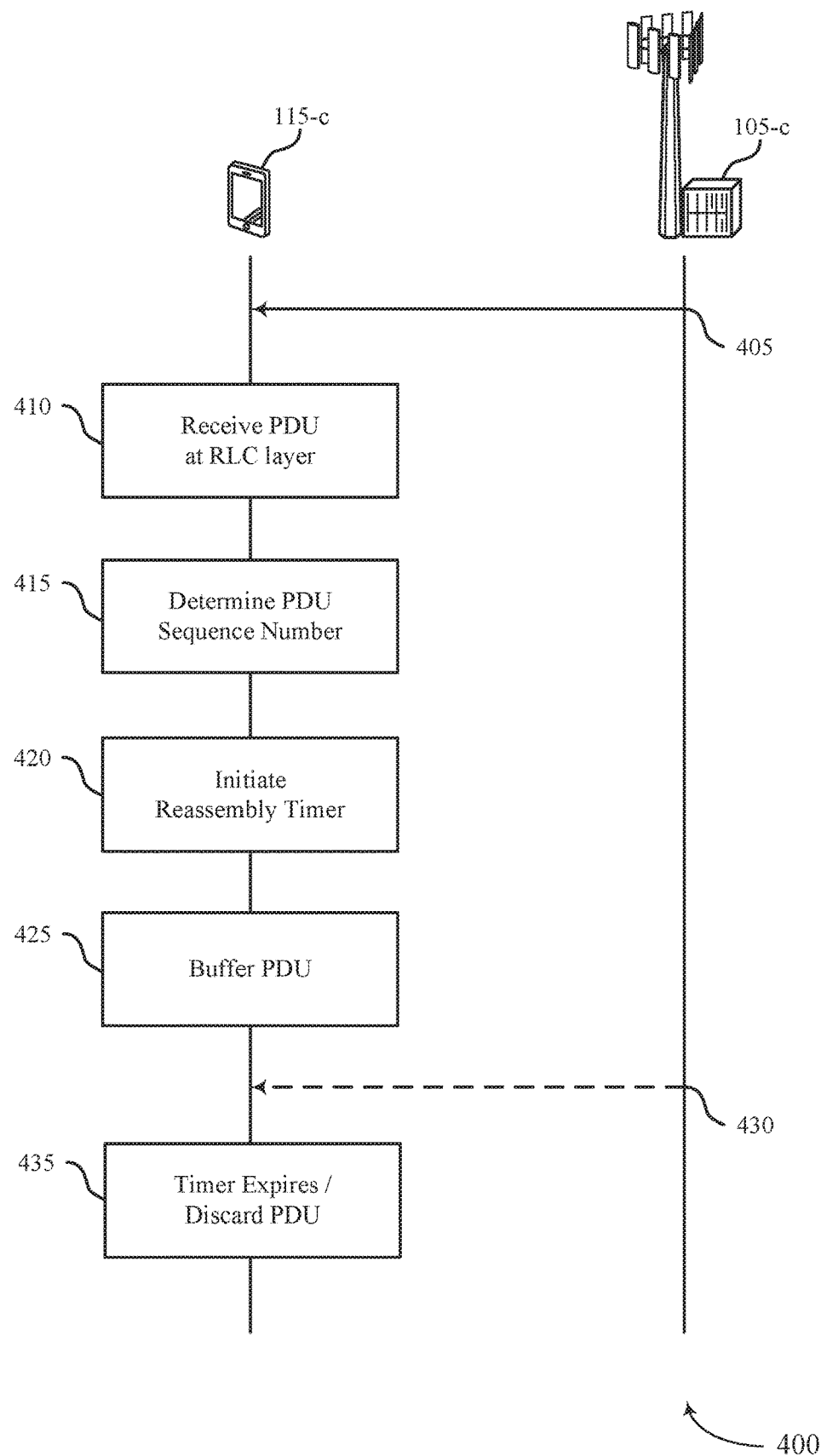
FIG. 4 illustrates an example of a process flow that supports RLC unacknowledged mode receive techniques in accordance with aspects of the present disclosure.

FIG. 4 illustrates an example of a process flow 400 that supports RLC receive techniques in accordance with various aspects of the present disclosure. Process flow 400 includes base station 105-*c* and UE 115-*c*, which may be examples of base stations 105 and UEs 115 as described with reference to FIGS. 1 and 2. Process flow 400 may illustrate UE 115-*c* performing RLC PDU reassembly techniques for communications received from base station 105-*c*. In the following description of the process flow 400, some of the operations between the UE 115-*c* and the base station 105-*c* may be transmitted in a different order than the exemplary order shown, or the operations performed by UE 115-*c* may be performed in different orders or at different times. For example, the techniques performed by UE 115-*c* may in some cases be implemented by base station 105-*c*, for communications received from UE 115-*c* by the base station 105-*c*. In some cases, certain operations may also be left out of the process flow 400, or other operations may be added to the process flow 400.

At 405, base station 105-*c* may transmit a packet to UE 115-*c*.

At 410, UE 115-*c* may receive the packet and pass the packet to an RLC layer (e.g., the UE 115-*c* may receive an RLC PDU).

At 415, the UE 115-*c* may determine or identify a sequence number associated with the received RLC PDU (e.g., the RLC PDU may be an RLC SDU segment).

At 420, the UE 115-*c* may initiate a reassembly timer based on, for example, the sequence number determined at 415. For example, the timer may be initiated if the sequence number is new or indicates a gap in received PDUs At 425, the UE 115-*c* may buffer the received RLC PDU.

In some cases, at 430, UE 115-*c* may receive a duplicate packet, which may be discarded or may receive other packets that are not associated with the RLC PDU or RLC SDU segment that was received at 405.

At 435, UE 115-*c* may discard the PDU received at 410 due to the timer (e.g., initiated at 420) expiring without receiving the remaining SDU segments associated with the PDU.

Figure 5:
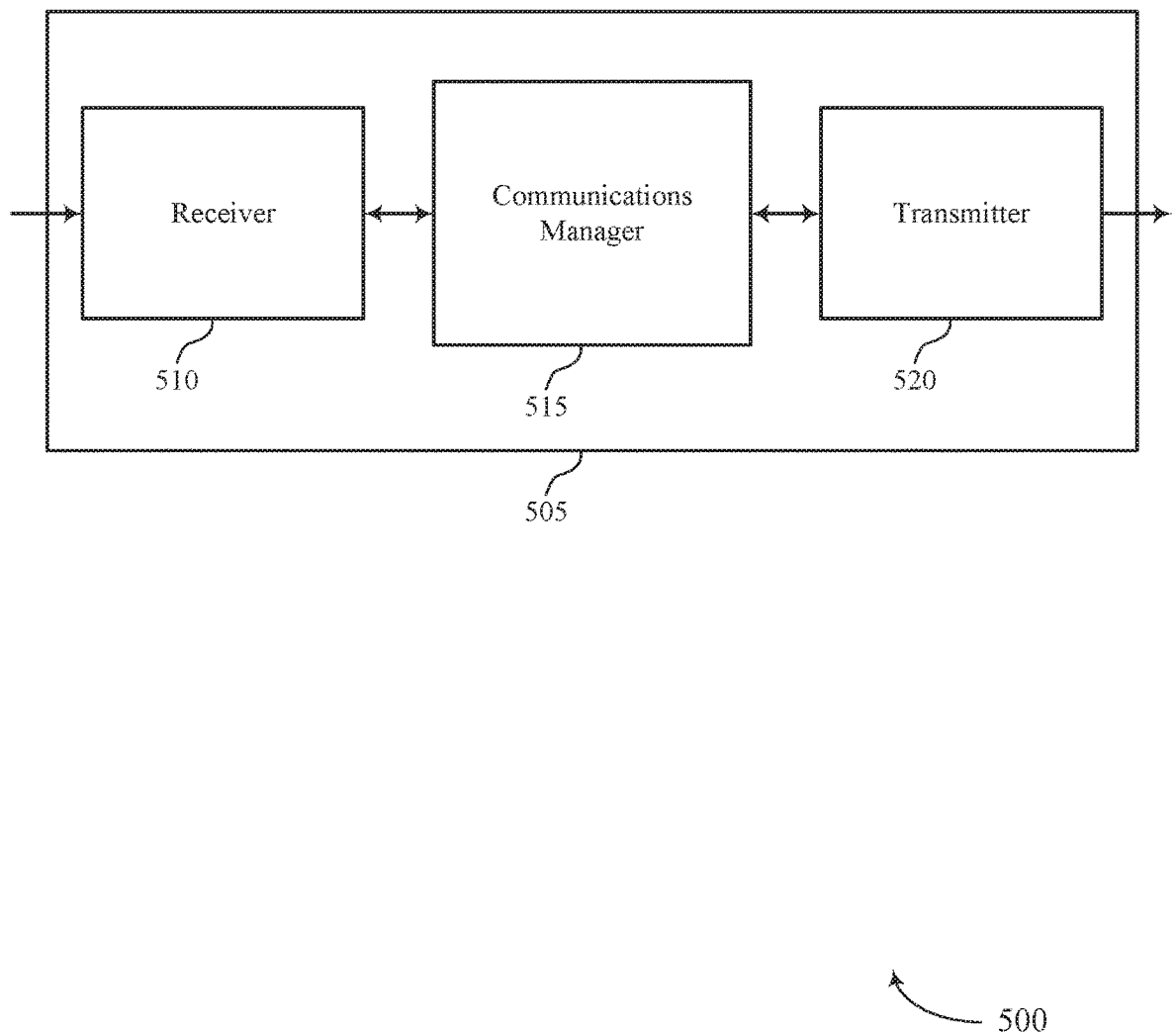
FIGS. 5 through 7 show block diagrams of a device that supports RLC unacknowledged mode receive techniques in accordance with aspects of the present disclosure.

FIG. 5 shows a block diagram 500 of a wireless device 505 that supports RLC unacknowledged mode receive techniques in accordance with aspects of the present disclosure. Wireless device 505 may be an example of aspects of a UE 115 and/or a base station 105 as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to RLC unacknowledged mode receive techniques, etc.). Information may be passed on to other components of the device. The receiver 510 may be an example of aspects of the transceiver 835 described with reference to FIG. 8. The receiver 510 may utilize a single antenna or a set of antennas.

Communications manager 515 may be an example of aspects of the communications manager 815 described with reference to FIG. 8. Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 515 may receive (e.g., at an RLC layer) a PDU from a lower layer and identify that the PDU is an RLC SDU segment based on an indication corresponding to a sequence number associated with the RLC SDU segment. Communications manager 515 may determine that the RLC SDU segment is received out of order based on previously received PDUs or previously received RLC SDU segments, and initiate a reassembly timer based on the determination that the RLC SDU segment is received out of order. The communications manager 515 may also receive (e.g., at an RLC layer) a PDU from a lower layer, identify that the PDU is a complete RLC SDU, determine that a previously received RLC SDU segment is stored in a receive buffer at the RLC layer, and initiate a reassembly timer based on the determination that the previously received RLC SDU segment is stored in a receive buffer at the RLC layer.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
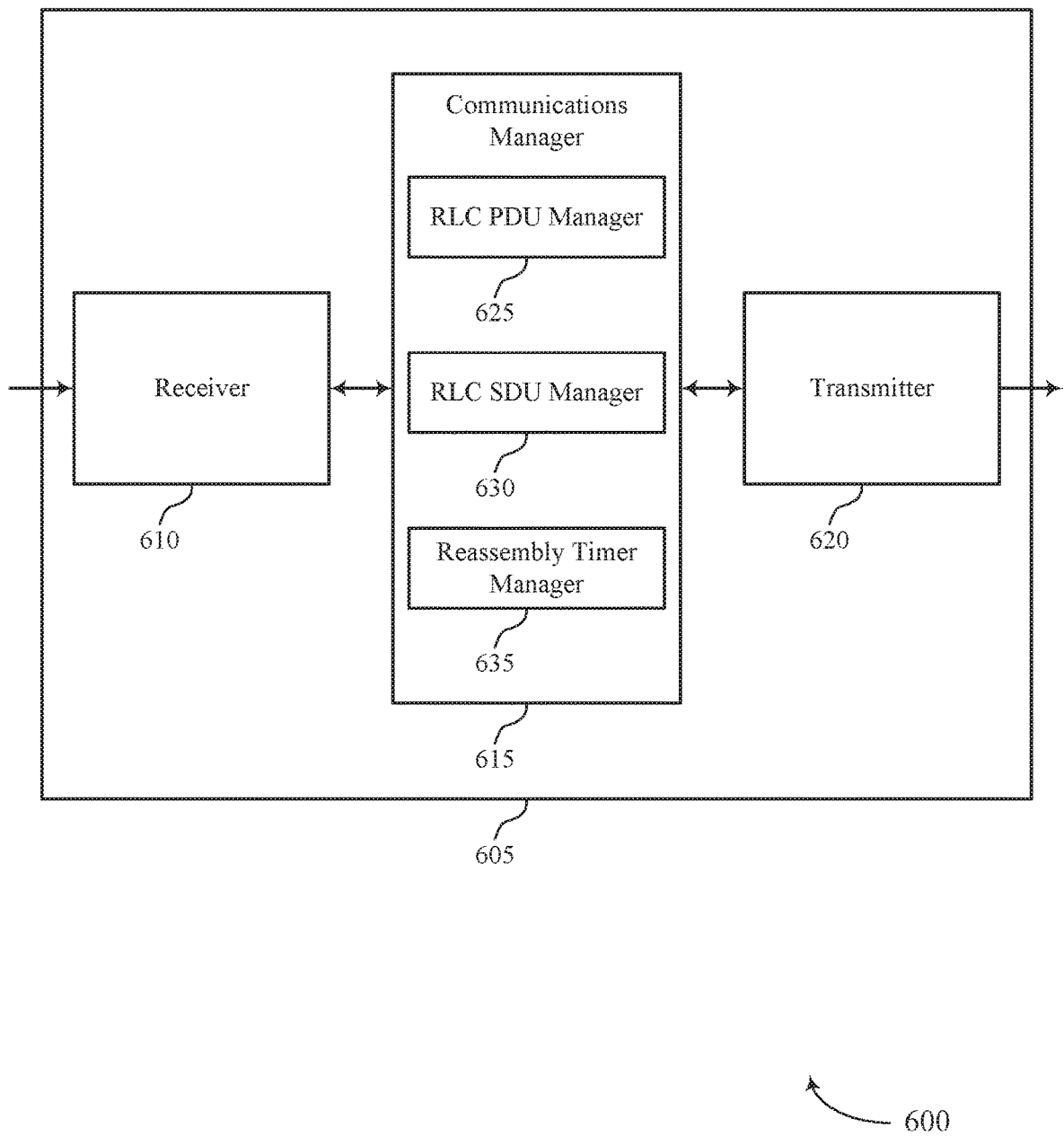

FIG. 6 shows a block diagram 600 of a wireless device 605 that supports RLC unacknowledged mode receive techniques in accordance with aspects of the present disclosure. Wireless device 605 may be an example of aspects of a wireless device 505 or a UE 115 and/or a base station 105 as described with reference to FIG. 5. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to RLC unacknowledged mode receive techniques, etc.). Information may be passed on to other components of the device. The receiver 610 may be an example of aspects of the transceiver 835 described with reference to FIG. 8. The receiver 610 may utilize a single antenna or a set of antennas.

Communications manager 615 may be an example of aspects of the communications manager 815 described with reference to FIG. 8. Communications manager 615 may also include RLC PDU manager 625, RLC SDU manager 630, and reassembly timer manager 635.

RLC PDU manager 625 may receive (e.g., at an RLC layer) a PDU from a lower layer and update a value of a variable (e.g., a stored state variable) based on a largest unassembled sequence number after a largest reassembled sequence number.

RLC SDU manager 630 may identify that the PDU is an RLC SDU segment based on an indication corresponding to a sequence number associated with the RLC SDU segment. RLC SDU manager 630 may determine that one or more RLC SDU segments stored in a receive buffer are not in sequence (e.g., and the reassembly timer manager 635 may initiate a reassembly timer based on the determination that one or more SDU segments stored in the receive buffer are not in sequence). The RLC SDU manager 630 may determine that the sequence number associated with the RLC SDU segment is greater than a highest sequence number associated with the previously received PDUs or previously received RLC SDU segments. RLC SDU manager 630 may determine that the RLC SDU segment is received out of order based on previously received PDUs or previously received RLC SDU segments. RLC SDU manager 630 may update a value of a variable based on a largest unassembled sequence number after a largest reassembled sequence number. RLC SDU manager 630 may identify that the PDU is a complete RLC SDU. RLC SDU manager 630 may determine that a previously received RLC SDU segment is stored in a receive buffer at the RLC layer. RLC SDU manager 630 may identify a missing RLC SDU segment of an RLC SDU based on the previously received RLC SDU segment stored in the receive buffer and the complete SDU. RLC SDU manager 630 may identify a gap between previously received PDUs or previously received RLC SDU segments based on the complete SDU. RLC SDU manager 630 may determine that a sequence number associated with the RLC SDU segment is greater than a highest sequence number associated with previously received PDUs or previously received RLC SDU segments. RLC SDU manager 630 may update a value of a variable corresponding to the highest sequence number with the sequence number associated with the RLC SDU segment.

In some cases, an indication corresponding to the sequence number includes a value in a header of the RLC SDU segment that indicates the sequence number or a segmentation identifier in the header of the RLC SDU segment. In some cases, determining that the RLC SDU segment is received out of order includes identifying a missing RLC SDU segment of an RLC SDU based on the received RLC SDU segment and the previously received PDUs or previously received RLC SDU segments. In some cases, identifying the missing RLC SDU segment of the RLC SDU includes identifying a gap between the previously received PDUs or previously received RLC SDU segments. In some cases, the missing RLC SDU segment includes a first byte of the RLC SDU and the received RLC SDU segment includes a second byte following the first byte. In some cases, the missing RLC SDU segment includes a last byte of the RLC SDU and the received RLC SDU segment excludes a corresponding sequence number. In some cases, the missing RLC SDU segment is associated with a first sequence number and the sequence number associated with the received RLC SDU segment is greater than the first sequence number. In some cases, determining that the sequence number associated with the RLC SDU segment is greater than the highest sequence number includes determining that the sequence number associated with the PDU is greater than zero. In some cases, the indication corresponding to the sequence number includes a value in a header of the RLC SDU segment that indicates the sequence number or a segmentation identifier in the header of the RLC SDU segment. In some cases, determining that the sequence number associated with the RLC SDU segment is greater than the highest sequence number includes determining that the sequence number associated with the PDU is greater than zero.

Reassembly timer manager 635 may initiate a reassembly timer based on the determination that the RLC SDU segment is received out of order. Reassembly timer manager 635 may restart the reassembly timer based on the determination that one or more RLC SDU segments remaining in the receive buffer are out of order. Reassembly timer manager 635 may initiate a reassembly timer based on the determination that the previously received RLC SDU segment is stored in a receive buffer at the RLC layer. In some cases, the reassembly timer includes a t-reassembly timer or a t-reordering timer.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
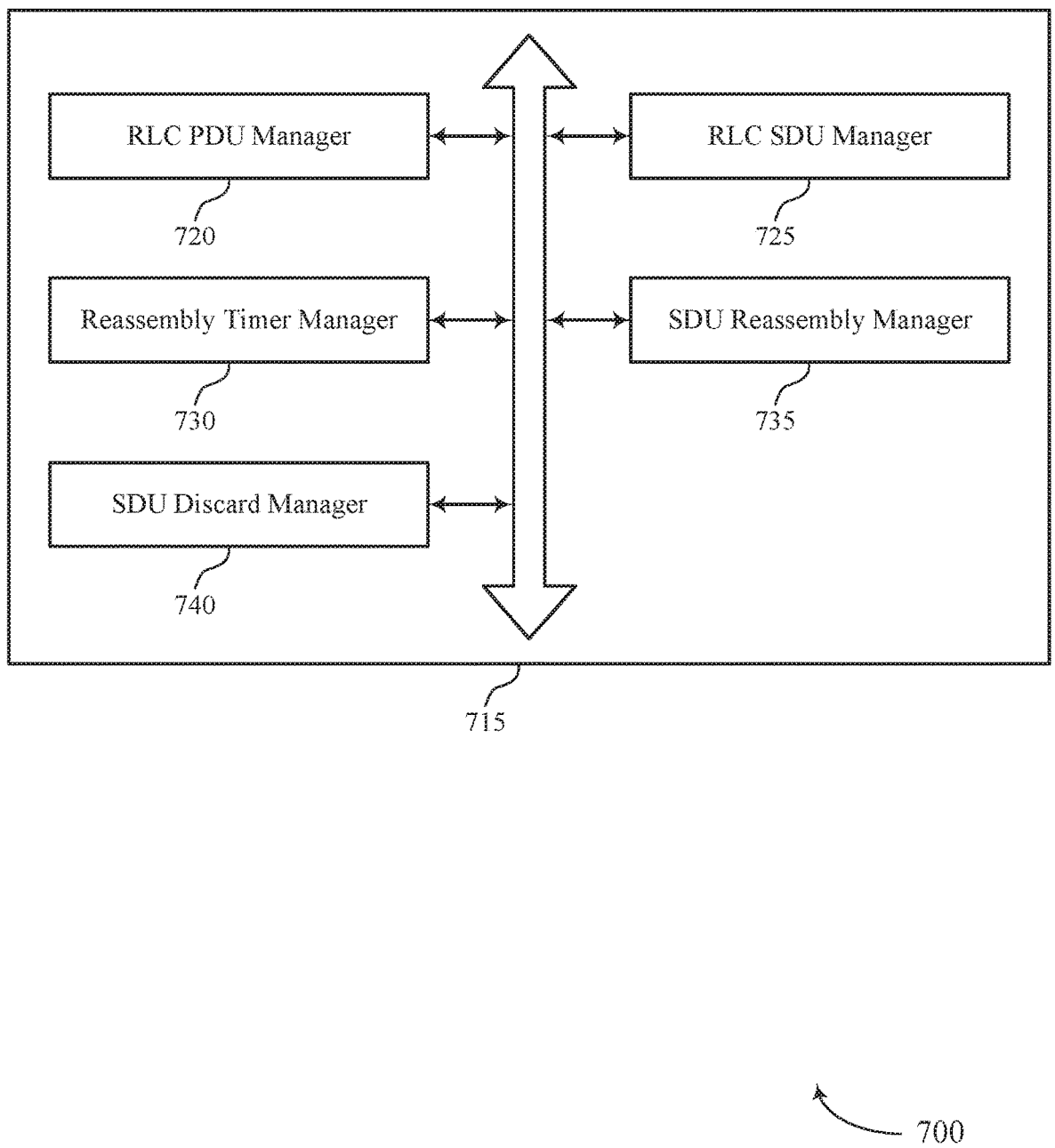

FIG. 7 shows a block diagram 700 of a communications manager 715 that supports RLC unacknowledged mode receive techniques in accordance with aspects of the present disclosure. The communications manager 715 may be an example of aspects of a communications manager 515, a communications manager 615, or a communications manager 815 described with reference to FIGS. 5, 6, and 8. The communications manager 715 may include RLC PDU manager 720, RLC SDU manager 725, reassembly timer manager 730, SDU reassembly manager 735, and SDU discard manager 740. Each of these modules may communicate, directly or indirectly, with one another (e.g., via one or more buses).

RLC PDU manager 720 may receive (e.g., at an RLC layer) a PDU from a lower layer and update a value of a variable based on a largest unassembled sequence number after a largest reassembled sequence number.

RLC SDU manager 725 may identify that the PDU is an RLC SDU segment based on an indication corresponding to a sequence number associated with the RLC SDU segment. RLC SDU manager 725 may determine that one or more RLC SDU segments stored in a receive buffer are not in sequence, where the reassembly timer is initiated based on the determination that one or more SDU segments stored in the receive buffer are not in sequence. RLC SDU manager 725 may determine that the sequence number associated with the RLC SDU segment is greater than a highest sequence number associated with the previously received PDUs or previously received RLC SDU segments. RLC SDU manager 725 may determine that the RLC SDU segment is received out of order based on previously received PDUs or previously received RLC SDU segments. RLC SDU manager 725 may update a value of a variable based on a largest unassembled sequence number after a largest reassembled sequence number. In some cases, RLC SDU manager 725 may identify that the PDU is a complete RLC SDU. RLC SDU manager 725 may determine that a previously received RLC SDU segment is stored in a receive buffer at the RLC layer. RLC SDU manager 725 may identify a missing RLC SDU segment of an RLC SDU based on the previously received RLC SDU segment stored in the receive buffer and the complete SDU. RLC SDU manager 725 may identify a gap between previously received PDUs or previously received RLC SDU segments based on the complete SDU. RLC SDU manager 725 may determine that a sequence number associated with the RLC SDU segment is greater than a highest sequence number associated with previously received PDUs or previously received RLC SDU segments. RLC SDU manager 725 may update a value of a variable corresponding to the highest sequence number with the sequence number associated with the RLC SDU segment.

In some cases, an indication corresponding to the sequence number includes a value in a header of the RLC SDU segment that indicates the sequence number or a segmentation identifier in the header of the RLC SDU segment. In some cases, determining that the RLC SDU segment is received out of order includes identifying a missing RLC SDU segment of an RLC SDU based on the received RLC SDU segment and the previously received PDUs or previously received RLC SDU segments. In some cases, identifying the missing RLC SDU segment of the RLC SDU includes identifying a gap between the previously received PDUs or previously received RLC SDU segments. In some cases, the missing RLC SDU segment includes a first byte of the RLC SDU and the received RLC SDU segment includes a second byte following the first byte. In some cases, the missing RLC SDU segment includes a last byte of the RLC SDU and the received RLC SDU segment excludes a corresponding sequence number. In some cases, the missing RLC SDU segment is associated with a first sequence number and the sequence number associated with the received RLC SDU segment is greater than the first sequence number. In some cases, determining that the sequence number associated with the RLC SDU segment is greater than the highest sequence number includes determining that the sequence number associated with the PDU is greater than zero. In some cases, the indication corresponding to the sequence number includes a value in a header of the RLC SDU segment that indicates the sequence number or a segmentation identifier in the header of the RLC SDU segment. In some cases, determining that the sequence number associated with the RLC SDU segment is greater than the highest sequence number includes determining that the sequence number associated with the PDU is greater than zero.

Reassembly timer manager 730 may initiate a reassembly timer based on the determination that the RLC SDU segment is received out of order. In some cases, reassembly timer manager 730 may restart the reassembly timer based on the determination that one or more RLC SDU segments remaining in the receive buffer are out of order. Reassembly timer manager 730 may initiate a reassembly timer based on the determination that the previously received RLC SDU segment is stored in a receive buffer at the RLC layer. In some cases, the reassembly timer includes a t-reassembly timer or a t-reordering timer.

SDU reassembly manager 735 may perform reassembly of one or more SDUs that includes the RLC SDU segment and one or more previously received SDU segments based on the reassembly timer and perform reassembly of one or more SDUs corresponding to a sequence number associated with the reassembly timer, where the initiated reassembly timer corresponds to the sequence number. In some cases, the reassembly of the SDU is performed prior to expiration of the reassembly timer. In some cases, the reassembly of the SDU is performed prior to expiration of the reassembly timer.

SDU discard manager 740 may discard the RLC SDU segments associated with the sequence number based on the reassembly timer exceeding a threshold. SDU discard manager 740 may discard one or more unassembled RLC SDU segments stored in a receive buffer upon expiration of the reassembly timer based on a value of a variable corresponding to a highest sequence number of the RLC SDU segment set when initiating the reassembly timer. SDU discard manager 740 may discard one or more unassembled RLC SDU segments stored in a receive buffer upon expiration of the reassembly timer based on a value of a variable corresponding to a largest unassembled sequence number after a largest reassembled sequence number set when initiating the reassembly timer. SDU discard manager 740 may restart the reassembly timer based on the determination that one or more RLC SDU segments remaining in the receive buffer are out of order.

Figure 8:
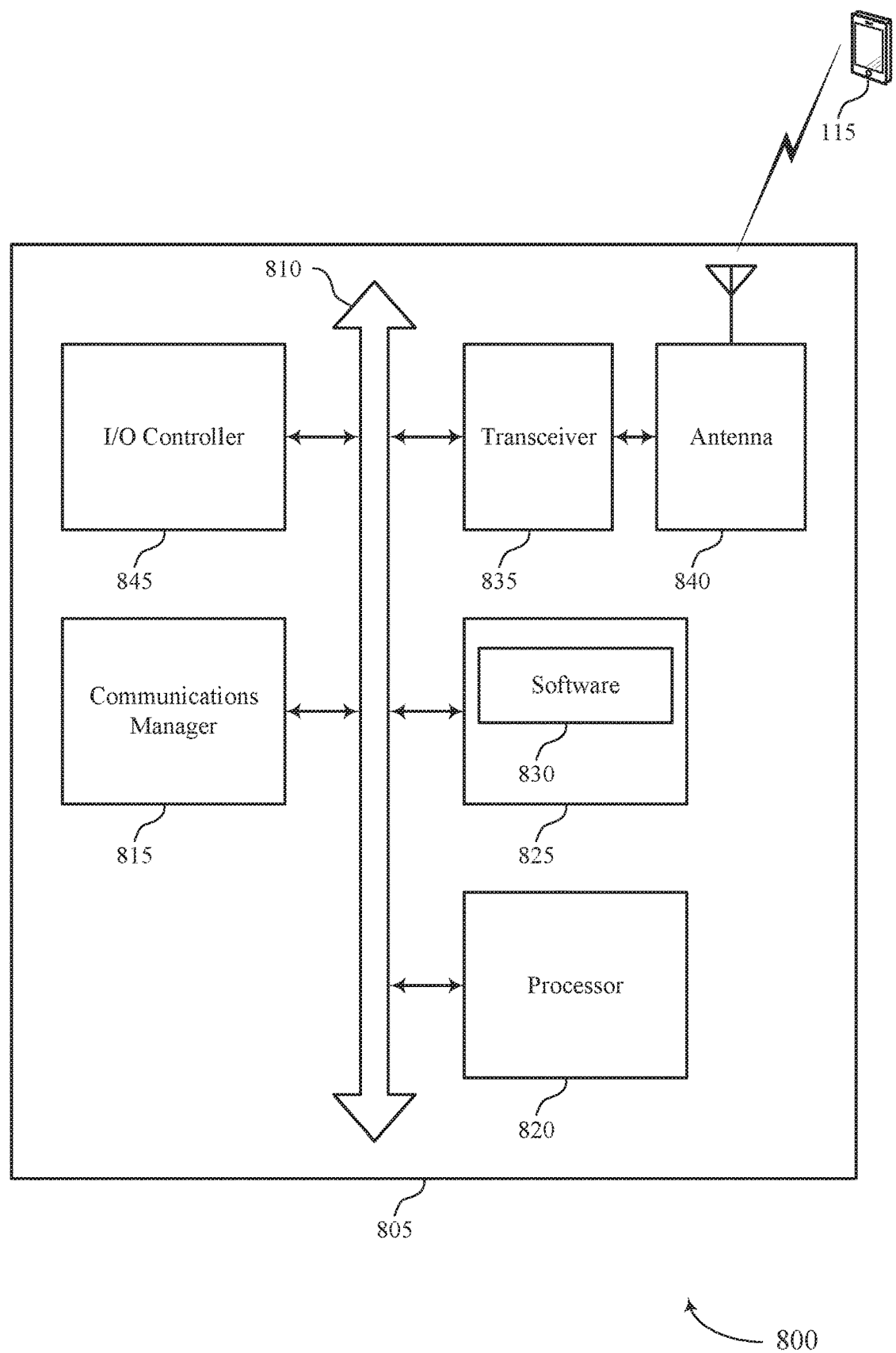
FIG. 8 illustrates a block diagram of a system including a wireless device that supports RLC unacknowledged mode receive techniques in accordance with aspects of the present disclosure.

FIG. 8 shows a diagram of a system 800 including a device 805 that supports RLC unacknowledged mode receive techniques in accordance with aspects of the present disclosure. Device 805 may be an example of or include the components of wireless device 505, wireless device 605, or a UE 115 and/or a base station 105 as described above, e.g., with reference to FIGS. 5 and 6. Device 805 may include components for bi-directional voice and data communications including components for transmitting and receiving communications, including communications manager 815, processor 820, memory 825, software 830, transceiver 835, antenna 840, and I/O controller 845. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting RLC unacknowledged mode receive techniques).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support RLC unacknowledged mode receive techniques. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2@, UNIX®, LINUX@, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
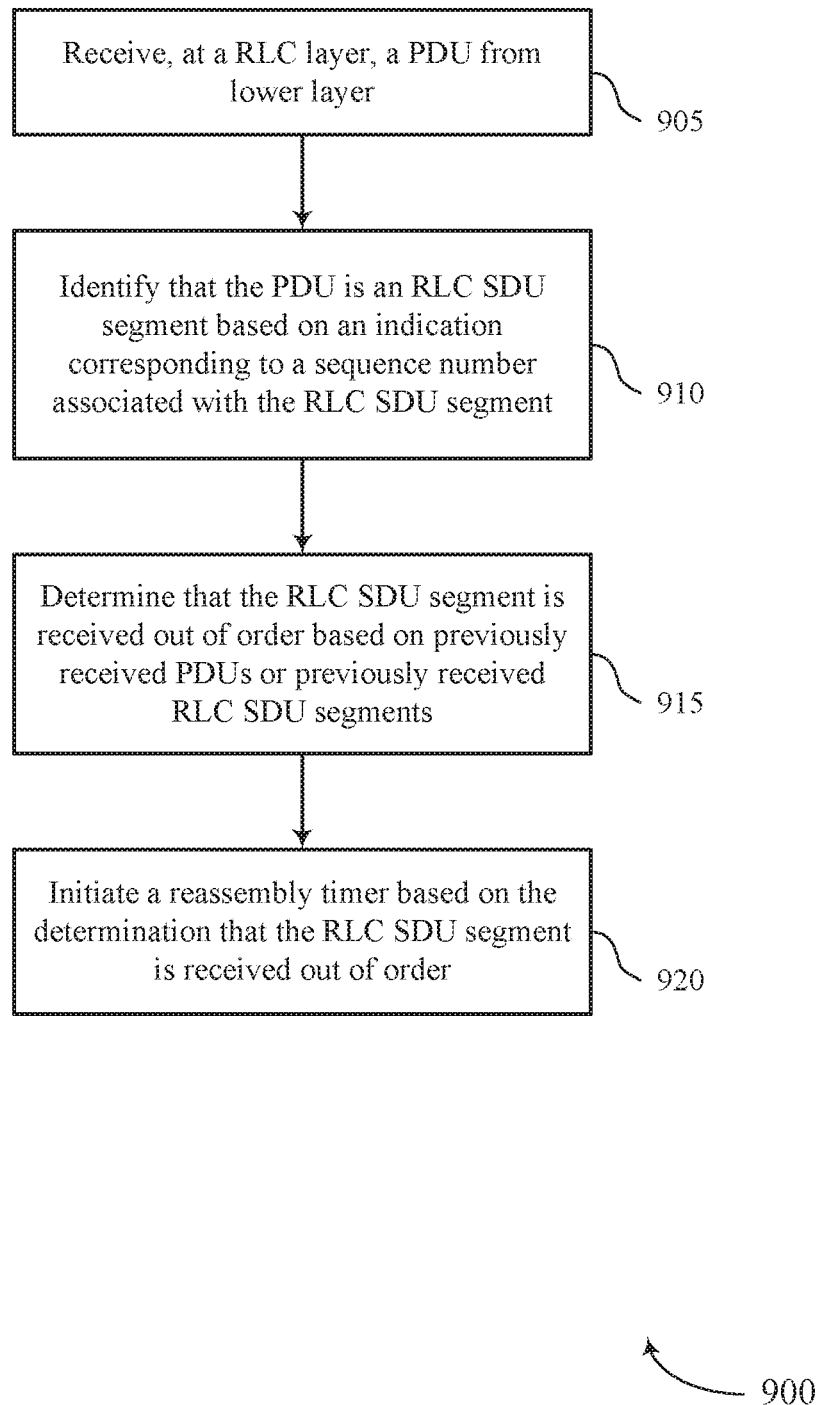
FIGS. 9 through 11 illustrate methods for RLC unacknowledged mode receive techniques in accordance with aspects of the present disclosure.

FIG. 9 shows a flowchart illustrating a method 900 for RLC unacknowledged mode receive techniques in accordance with aspects of the present disclosure. The operations of method 900 may be implemented by a UE 115 and/or a base station 105 or its components as described herein. For example, the operations of method 900 may be performed by a communications manager as described with reference to FIGS. 5 through 8. In some examples, a UE 115 and/or a base station 105 may execute a set of codes to control the functional elements of the device to perform the functions described below. Additionally or alternatively, the UE 115 and/or a base station 105 may perform aspects of the functions described below using special-purpose hardware.

At block 905 the UE 115 and/or a base station 105 may receive, at an RLC layer, a PDU from a lower layer. The operations of block 905 may be performed according to the methods described herein. In certain examples, aspects of the operations of block 905 may be performed by an RLC PDU manager as described with reference to FIGS. 5 through 8.

At block 910 the UE 115 and/or a base station 105 may identify that the PDU is an RLC SDU segment based at least in part on an indication corresponding to a sequence number associated with the RLC SDU segment. The operations of block 910 may be performed according to the methods described herein. In certain examples, aspects of the operations of block 910 may be performed by an RLC SDU manager as described with reference to FIGS. 5 through 8.

At block 915 the UE 115 and/or a base station 105 may determine that the RLC SDU segment is received out of order based at least in part on previously received PDUs or previously received RLC SDU segments. The operations of block 915 may be performed according to the methods described herein. In certain examples, aspects of the operations of block 915 may be performed by an RLC SDU manager as described with reference to FIGS. 5 through 8.

At block 920 the UE 115 and/or a base station 105 may initiate a reassembly timer based at least in part on the determination that the RLC SDU segment is received out of order. The operations of block 920 may be performed according to the methods described herein. In certain examples, aspects of the operations of block 920 may be performed by a reassembly timer manager as described with reference to FIGS. 5 through 8.

Figure 10:
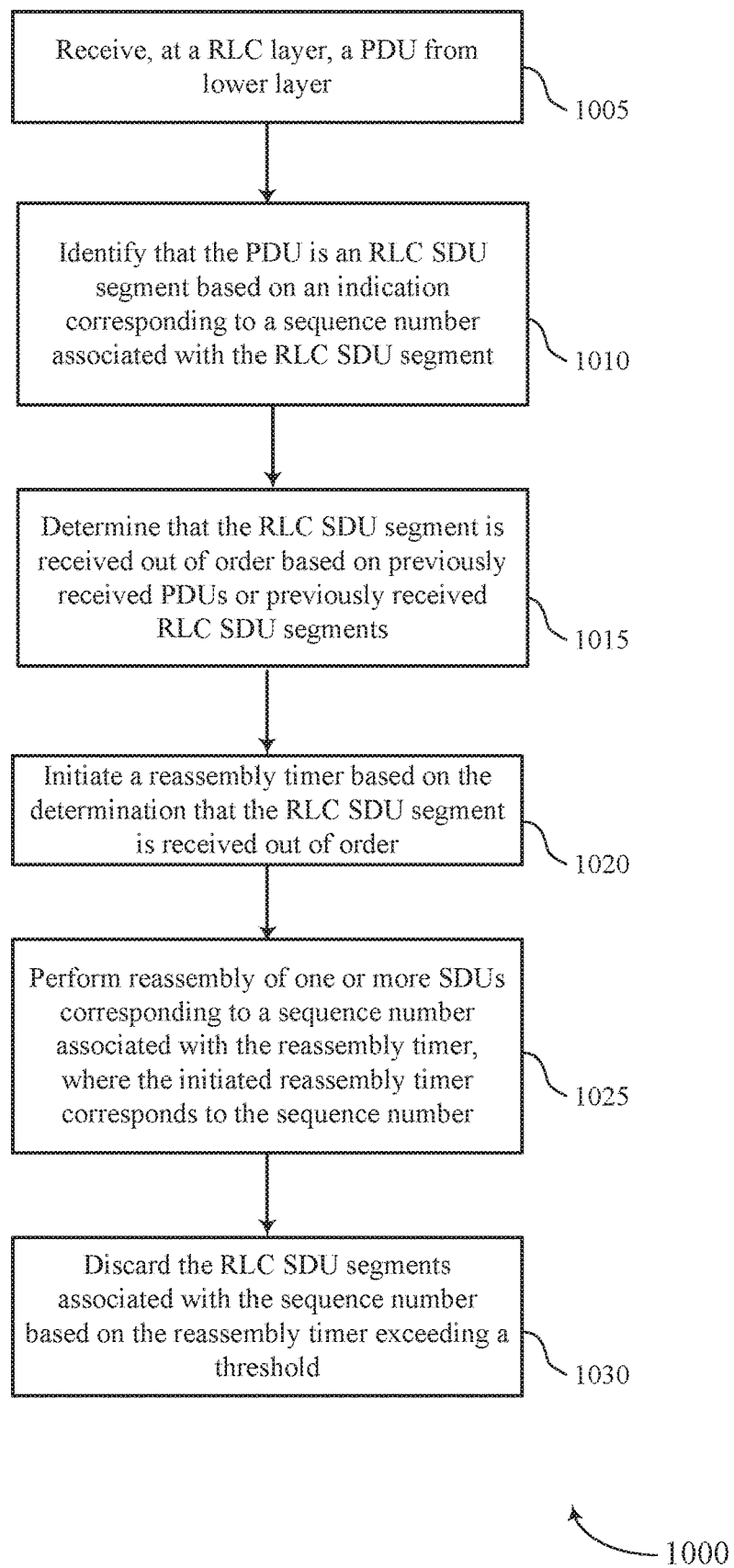

FIG. 10 shows a flowchart illustrating a method 1000 for RLC unacknowledged mode receive techniques in accordance with aspects of the present disclosure. The operations of method 1000 may be implemented by a UE 115 and/or a base station 105 or its components as described herein. For example, the operations of method 1000 may be performed by a communications manager as described with reference to FIGS. 5 through 8. In some examples, a UE 115 and/or a base station 105 may execute a set of codes to control the functional elements of the device to perform the functions described below. Additionally or alternatively, the UE 115 and/or a base station 105 may perform aspects of the functions described below using special-purpose hardware.

At block 1005 the UE 115 and/or a base station 105 may receive, at an RLC layer, a PDU from a lower layer. The operations of block 1005 may be performed according to the methods described herein. In certain examples, aspects of the operations of block 1005 may be performed by an RLC PDU manager as described with reference to FIGS. 5 through 8.

At block 1010 the UE 115 and/or a base station 105 may identify that the PDU is an RLC SDU segment based at least in part on an indication corresponding to a sequence number associated with the RLC SDU segment. The operations of block 1010 may be performed according to the methods described herein. In certain examples, aspects of the operations of block 1010 may be performed by an RLC SDU manager as described with reference to FIGS. 5 through 8.

At block 1015 the UE 115 and/or a base station 105 may determine that the RLC SDU segment is received out of order based at least in part on previously received PDUs or previously received RLC SDU segments. The operations of block 1015 may be performed according to the methods described herein. In certain examples, aspects of the operations of block 1015 may be performed by an RLC SDU manager as described with reference to FIGS. 5 through 8.

At block 1020 the UE 115 and/or a base station 105 may initiate a reassembly timer based at least in part on the determination that the RLC SDU segment is receive out of order. In some instances, the timer may be initiated if it is not currently running. For example, the reassembly timer may be initiated if the received RLC SDU segment does not include a sequence number and at least one RLC SDU packet that includes a sequence number is buffered. In some cases, the reassembly timer may be initiated if the received RLC SDU segment includes a sequence number that is different than the sequence number of at least one RLC SDU segment in the buffer. In other examples, the reassembly timer may be initiated if the received RLC SDU segment has a sequence number as a buffered RLC SDU segment but the two segments are not in consecutive byte order. The operations of block 1020 may be performed according to the methods described herein. In certain examples, aspects of the operations of block 1020 may be performed by an RLC SDU manager as described with reference to FIGS. 5 through 8.

At block 1025 the UE 115 and/or a base station 105 may perform reassembly of one or more SDUs corresponding to a sequence number associated with the reassembly timer, wherein the initiated reassembly timer corresponds to the sequence number. The operations of block 1025 may be performed according to the methods described herein. In certain examples, aspects of the operations of block 1025 may be performed by a SDU reassembly manager as described with reference to FIGS. 5 through 8.

At block 1030 the UE 115 and/or a base station 105 may discard the RLC SDU segments associated with the sequence number based at least in part on the reassembly timer exceeding a threshold. The operations of block 1030 may be performed according to the methods described herein. In certain examples, aspects of the operations of block 1030 may be performed by a SDU discard manager as described with reference to FIGS. 5 through 8.

Figure 11:
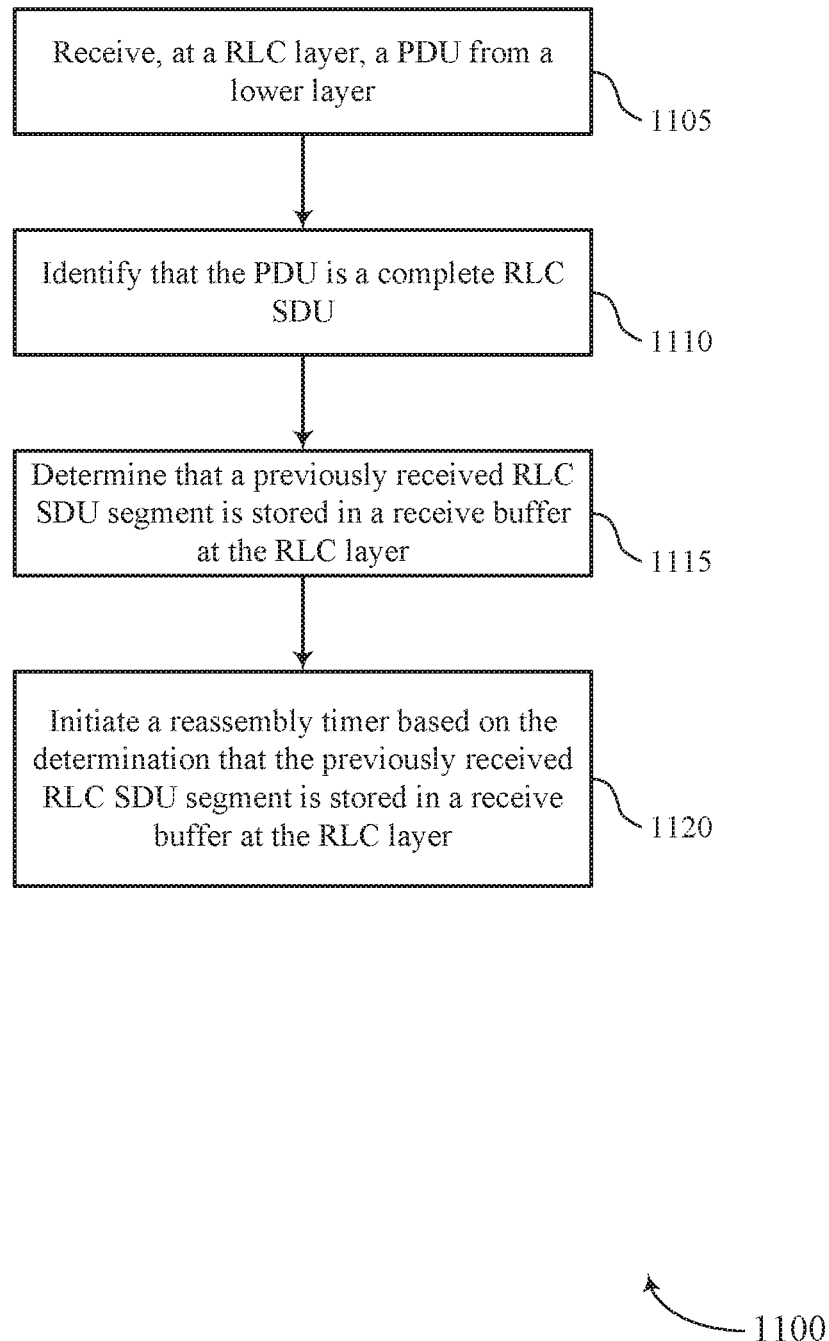

FIG. 11 shows a flowchart illustrating a method 1100 for RLC unacknowledged mode receive techniques in accordance with aspects of the present disclosure. The operations of method 1100 may be implemented by a UE 115 and/or a base station 105 or its components as described herein. For example, the operations of method 1100 may be performed by a communications manager as described with reference to FIGS. 5 through 8. In some examples, a UE 115 and/or a base station 105 may execute a set of codes to control the functional elements of the device to perform the functions described below. Additionally or alternatively, the UE 115 and/or a base station 105 may perform aspects of the functions described below using special-purpose hardware.

At block 1105 the UE 115 and/or a base station 105 may receive, at an RLC layer, a PDU from a lower layer. The operations of block 1105 may be performed according to the methods described herein. In certain examples, aspects of the operations of block 1105 may be performed by an RLC PDU manager as described with reference to FIGS. 5 through 8.

At block 1110 the UE 115 and/or a base station 105 may identify that the PDU is a complete RLC SDU. The operations of block 1110 may be performed according to the methods described herein. In certain examples, aspects of the operations of block 1110 may be performed by an RLC SDU manager as described with reference to FIGS. 5 through 8.

At block 1115 the UE 115 and/or a base station 105 may determine that a previously received RLC SDU segment is stored in a receive buffer at the RLC layer. The operations of block 1115 may be performed according to the methods described herein. In certain examples, aspects of the operations of block 1115 may be performed by an RLC SDU manager as described with reference to FIGS. 5 through 8.

At block 1120 the UE 115 and/or a base station 105 may initiate a reassembly timer based at least in part on the determination that the previously received RLC SDU segment is stored in a receive buffer at the RLC layer. The operations of block 1120 may be performed according to the methods described herein. In certain examples, aspects of the operations of block 1120 may be performed by a reassembly timer manager as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 IX, IX, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a radio link control (RLC) layer, a protocol data unit (PDU) from a lower layer, the PDU being an RLC service data unit (SDU) segment if comprising a header including a sequence number and being a complete SDU if comprising a header excluding the sequence number;
   identifying that the PDU is the RLC (SDU) segment based at least in part on the PDU comprising the header including the sequence number;
   determining that the RLC SDU segment is received out of order based at least in part on previously received PDUs or previously received RLC SDU segments; and
   initiating a reassembly timer based at least in part on the determination that the RLC SDU segment is received out of order.

2. The method of claim 1, further comprising:
   determining that one or more RLC SDU segments stored in a receive buffer are not in sequence, wherein the reassembly timer is initiated based at least in part on the determination that one or more SDU segments stored in the receive buffer are not in sequence.

3. The method of claim 1, wherein determining that the RLC SDU segment is received out of order comprises:
   identifying a missing RLC SDU segment of an RLC SDU based at least in part on the received RLC SDU segment and the previously received PDUs or previously received RLC SDU segments.

4. The method of claim 3, wherein identifying the missing RLC SDU segment of the RLC SDU comprises:
   identifying a gap between the previously received PDUs or the previously received RLC SDU segments.

5. The method of claim 4, wherein the missing RLC SDU segment comprises a first byte of the RLC SDU and the received RLC SDU segment comprises a second byte following the first byte.

6. The method of claim 4, wherein the missing RLC SDU segment comprises a last byte of the RLC SDU and the received RLC SDU segment excludes a corresponding sequence number.

7. The method of claim 4, wherein the missing RLC SDU segment is associated with a first sequence number and the sequence number associated with the received RLC SDU segment is greater than the first sequence number.

8. The method of claim 1, further comprising:
   determining that the sequence number associated with the RLC SDU segment is greater than a highest sequence number associated with the previously received PDUs or the previously received RLC SDU segments; and
   updating a value of a variable corresponding to the highest sequence number with the sequence number associated with the RLC SDU segment.

9. The method of claim 1, further comprising:
   updating a value of a variable based at least in part on a largest unassembled sequence number after a largest reassembled sequence number.

10. The method of claim 1, further comprising:
    performing reassembly of one or more SDUs that includes the RLC SDU segment and one or more previously received SDU segments based at least in part on the reassembly timer.

11. The method of claim 10, wherein the reassembly of the SDU is performed prior to expiration of the reassembly timer.

12. The method of claim 1, further comprising:
    performing reassembly of one or more SDUs corresponding to a sequence number associated with the reassembly timer, wherein the initiated reassembly timer corresponds to the sequence number; and
    discarding the RLC SDU segments associated with the sequence number based at least in part on the reassembly timer exceeding a threshold.

13. The method of claim 1, further comprising:
discarding one or more unassembled RLC SDU segments stored in a receive buffer upon expiration of the reassembly timer based at least in part on a value of a variable corresponding to a largest unassembled sequence number after a largest reassembled sequence number set when initiating the reassembly timer.

14. The method of claim 13, further comprising:
restarting the reassembly timer based at least in part on the determination that one or more RLC SDU segments remaining in the receive buffer are out of order.

15. The method of claim 1, wherein the reassembly timer comprises a t-reassembly timer or a t-reordering timer.

16. A method for wireless communication, comprising:
receiving, at a radio link control (RLC) layer, a protocol data unit (PDU) from a lower layer, the PDU being an RLC service data unit (SDU) segment if comprising a header including a sequence number and being a complete SDU if comprising a header excluding the sequence number;
identifying that the PDU is the complete RLC SDU based at least in part on the PDU comprising the header excluding the sequence number;
determining that a previously received RLC SDU segment is stored in a receive buffer at the RLC layer; and
initiating a reassembly timer based at least in part on the determination that the previously received RLC SDU segment is stored in the receive buffer at the RLC layer.

17. The method of claim 16, further comprising:
identifying a missing RLC SDU segment of an RLC SDU based at least in part on the previously received RLC SDU segment stored in the receive buffer and the complete RLC SDU.

18. The method of claim 16, further comprising:
identifying a gap between previously received PDUs or previously received RLC SDU segments based at least in part on the complete RLC SDU.

19. The method of claim 16, further comprising:
determining that a sequence number associated with the previously received RLC SDU segment is greater than a highest sequence number associated with previously received PDUs or one or more other previously received RLC SDU segments.

20. The method of claim 19, further comprising:
updating a value of a variable corresponding to the highest sequence number with the sequence number associated with the previously received RLC SDU segment.

21. The method of claim 16, further comprising:
updating a value of a variable based at least in part on a largest unassembled sequence number after a largest reassembled sequence number.

22. The method of claim 16, wherein a previously received RLC SDU comprises a header of the previously received RLC SDU segment including a sequence number or a segmentation identifier associated with the previously received RLC SDU segment.

23. The method of claim 16, further comprising:
performing reassembly of one or more SDUs that includes the previously received RLC SDU segment and one or more previously received SDU segments based at least in part on the reassembly timer.

24. The method of claim 16, further comprising:
performing reassembly of one or more SDUs corresponding to a sequence number associated with the reassembly timer, wherein the initiated reassembly timer corresponds to the sequence number; and
discarding the RLC SDU segments associated with the sequence number based at least in part on the reassembly timer exceeding a threshold.

25. The method of claim 24, wherein the reassembly of the SDU is performed prior to expiration of the reassembly timer.

26. The method of claim 16, further comprising:
discarding one or more unassembled RLC SDU segments stored in a receive buffer upon expiration of the reassembly timer based at least in part on a value of a variable corresponding to a largest unassembled sequence number after a largest reassembled sequence number set when initiating the reassembly timer.

27. The method of claim 26, further comprising:
restarting the reassembly timer based at least in part on the determination that one or more RLC SDU segments remaining in the receive buffer are out of order.

28. An apparatus for wireless communication, comprising:
means for receiving, at a radio link control (RLC) layer, a protocol data unit (PDU) from a lower layer, the PDU being an RLC service data unit (SDU) segment if comprising a header including a sequence number and being a complete SDU if comprising a header excluding the sequence number;
means for identifying that the PDU is the RLC SDU segment based at least in part on the PDU comprising the header including the sequence number;
means for determining that the RLC SDU segment is received out of order based at least in part on previously received PDUs or previously received RLC SDU segments; and
means for initiating a reassembly timer based at least in part on the determination that the RLC SDU segment is received out of order.

29. An apparatus for wireless communication, comprising:
means for receiving, at a radio link control (RLC) layer, a protocol data unit (PDU) from a lower layer, the PDU being an RLC service data unit (SDU) segment if comprising a header including a sequence number and being a complete SDU if comprising a header excluding the sequence number;
means for identifying that the PDU is the complete RLC SDU based at least in part on the PDU comprising the header excluding the sequence number;
means for determining that a previously received RLC SDU segment is stored in a receive buffer at the RLC layer; and
means for initiating a reassembly timer based at least in part on the determination that the previously received RLC SDU segment is stored in a receive buffer at the RLC layer.

* * * * *